(12) United States Patent
Reipen et al.

(10) Patent No.: US 8,128,848 B2
(45) Date of Patent: Mar. 6, 2012

(54) DIKETOPYRROLOPYRROLE PIGMENT COMPOSITION FOR USE IN COLOR FILTERS

(75) Inventors: Tanja Reipen, Mainz (DE); Jens Reichwagen, Thun (CH); Matthias Ganschow, Wiesbaden (DE); Carsten Plueg, Muehltal / Niederbeerbach (DE); Lars Schneider, Liederbach (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/738,082

(22) PCT Filed: Sep. 16, 2008

(86) PCT No.: PCT/EP2008/007700
§ 371 (c)(1),
(2), (4) Date: Apr. 15, 2010

(87) PCT Pub. No.: WO2009/049736
PCT Pub. Date: Apr. 23, 2009

(65) Prior Publication Data
US 2010/0219384 A1 Sep. 2, 2010

(30) Foreign Application Priority Data

Oct. 17, 2007 (DE) .......... 10 2007 049 682
Jul. 8, 2008 (DE) .......... 10 2008 032 091

(51) Int. Cl.
F21V 9/00 (2006.01)
G02B 5/02 (2006.01)
G02C 7/10 (2006.01)
G02F 1/361 (2006.01)
G03B 11/00 (2006.01)
C08K 5/00 (2006.01)
C09D 11/00 (2006.01)
C07D 243/08 (2006.01)
G08G 9/00 (2006.01)

(52) U.S. Cl. .......... 252/582; 106/31.6; 106/31.65; 106/31.72; 106/494; 106/498; 252/586; 430/108.21; 524/92; 548/453

(58) Field of Classification Search .......... 252/586, 252/582; 106/31.6, 31.72, 498, 31.65, 494; 430/108.21; 548/453; 524/92, 597, 720
See application file for complete search history.

(56) References Cited

U.S. PATENT DOCUMENTS

| | | | | |
|---|---|---|---|---|
| 4,310,359 | A | | 1/1982 | Ehashi et al. |
| 4,579,949 | A | * | 4/1986 | Rochat et al. .......... 546/167 |
| 4,632,704 | A | | 12/1986 | Babler |
| 4,720,305 | A | * | 1/1988 | Iqbal et al. .......... 106/494 |
| 5,354,869 | A | * | 10/1994 | Langhals et al. .......... 548/453 |
| 5,466,807 | A | | 11/1995 | Dietz et al. |
| 5,476,949 | A | * | 12/1995 | Wallquist et al. .......... 548/453 |
| 5,869,625 | A | * | 2/1999 | Jaffe et al. .......... 8/639 |
| 6,437,198 | B1 | | 8/2002 | Friedrich et al. |
| 6,517,630 | B1 | * | 2/2003 | Grandidier et al. .......... 106/498 |
| 6,918,958 | B2 | | 7/2005 | Weber et al. |
| 7,045,637 | B2 | | 5/2006 | Weber et al. |
| 7,045,638 | B2 | | 5/2006 | Weber et al. |
| 7,102,014 | B2 | | 9/2006 | Weber et al. |
| 7,347,894 | B2 | * | 3/2008 | Yanagimoto et al. .......... 106/496 |
| 7,892,344 | B2 | | 2/2011 | Reipen et al. |
| 2001/0008912 | A1 | | 7/2001 | Weber et al. |
| 2003/0162976 | A1 | | 8/2003 | Weber et al. |
| 2003/0162977 | A1 | | 8/2003 | Weber et al. |
| 2004/0060478 | A1 | | 4/2004 | Weber et al. |
| 2004/0177790 | A1 | | 9/2004 | Weber et al. |
| 2006/0185558 | A1 | * | 8/2006 | Saikatsu et al. .......... 106/493 |
| 2010/0119966 | A1 | * | 5/2010 | Ganschow .......... 430/108.21 |
| 2010/0213421 | A1 | | 8/2010 | Ganschow et al. |
| 2010/0219384 | A1 | * | 9/2010 | Reipen et al. .......... 252/582 |

FOREIGN PATENT DOCUMENTS

| | | |
|---|---|---|
| DE | 3106906 | 1/1982 |
| EP | 0094911 | 11/1983 |
| EP | 0181290 | 5/1986 |
| EP | 0190999 | 8/1986 |
| EP | 0486531 | 5/1992 |
| EP | 0640603 | 3/1995 |
| EP | 0962499 A2 * | 12/1999 |
| EP | 1086067 | 3/2001 |
| EP | 1104789 | 6/2001 |
| EP | 1362081 | 11/2003 |
| EP | 1411091 | 4/2004 |
| EP | 1411092 | 4/2004 |
| EP | 1715007 | 10/2006 |
| EP | 2146230 | 1/2010 |
| WO | WO02085987 A1 * | 10/2002 |

OTHER PUBLICATIONS

PCT Search Report for PCT/EP 2008/007700, mailed Jun. 4, 2009.
English Translation of the International Preliminary Report on Patentability for PCT/EP 2008/007700, mailed May 20, 2010.
English Abstract for EP 2146230, Jan. 20, 2010.

* cited by examiner

*Primary Examiner* — Ling Choi
*Assistant Examiner* — Bijan Ahvazi
(74) *Attorney, Agent, or Firm* — Anthony A. Bisulca

(57) ABSTRACT

The invention relates to a pigment composition that is composed of compounds of formulas (I), (II) and (III), is characterized by a average particle size $d_{50}$ ranging from 10 to 60 nm, less than 5% by volume of the particles being greater than 70 nm, (I)

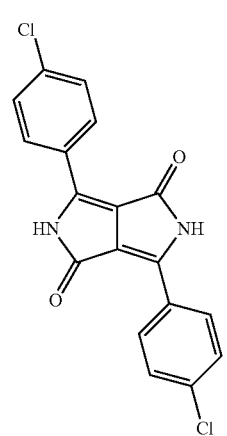

-continued
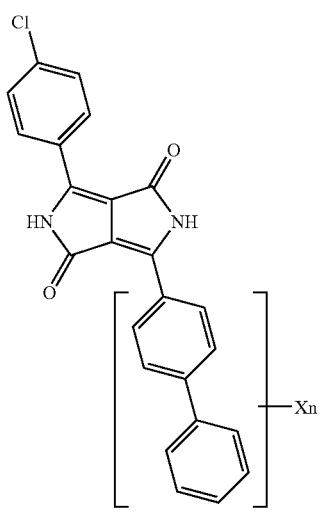
(II)
-continued
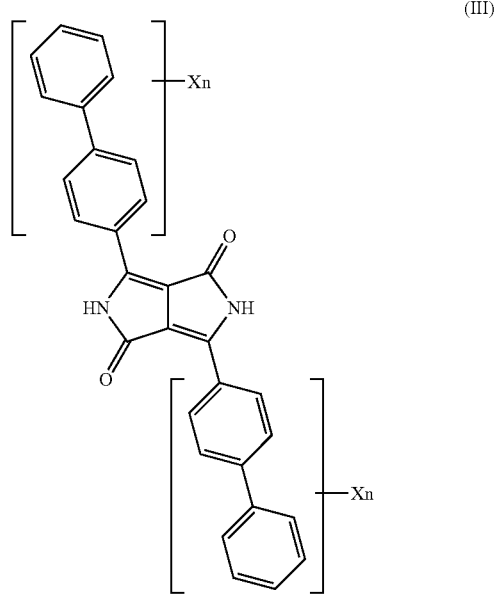
(III)
and can be obtained by reacting of 1 mol of a succinic acid diester with 2 mol of a mixture of nitriles A-CN and B-CN nitriles, the molar ratio of A-CN and B-CN in the nitrile mixture being in the range from 99.5:0.5 to 85.0:15.
19 Claims, No Drawings

DIKETOPYRROLOPYRROLE PIGMENT COMPOSITION FOR USE IN COLOR FILTERS

The present invention relates to a pigment composition of compounds of the formulae (I), (II) and (III), its preparation and also the use of this novel product as a pigment.

There are many uses of organic pigments where very good dispersibility and high heat stability is required, as for example in the coloration of metallic coatings or the use in color filters.

Color filters are manufactured using particularly finely divided pigments in order that particle scattering, which leads to a reduction in contrast ratio, may be substantially foreclosed.

Contrast ratio (CR) is measured by determining the light intensity after irradiation through a pigmented coating layer on a transparent substrate placed between two polarizers. Contrast ratio is the ratio of the light intensities for parallel and perpendicular polarizers.

$$CR = \frac{\text{light intensity (parallel)}}{\text{light intensity (perpendicular)}}$$

Commercially available products do not always meet all technical requirements. More particularly, there is a need for improvement with regard to particle size, dispersibility and heat stability on the part of these finely divided pigments without adverse effect on chroma and hue.

EP-A-0 094 911 discloses pigment compositions of diketopyrrolopyrroles (DPPs) obtainable by mixed synthesis from two different nitriles A and B and succinic diesters.

EP-A-0 181 290 discloses pigment compositions of diketopyrrolopyrroles (DPPs) obtainable by mixed synthesis from two different nitriles A and B and succinic diesters, but not useful for color filters owing to their particle size.

EP-A-0 962 499 discloses mixed syntheses involving equimolar amounts of various nitriles with succinic diesters in the presence of a crystal growth inhibitor. The reaction of 4-chlorobenzonitrile with substituted or unsubstituted cyanobiphenyl is not described.

WO 2002/085 987 discloses pigment compositions of diketopyrrolopyrroles for aqueous coating applications which are prepared by mixed synthesis from two different nitriles A and B and succinic diesters. The reaction of 4-chlorobenzonitrile with substituted or unsubstituted cyanobiphenyl is not mentioned.

EP-A-1 411 091 describes an involved two-stage process for producing finely crystalline pigment particles which consists of a combination of dry grinding and salt kneading to actively prevent recrystallization to larger particles.

U.S. Pat. No. 5,869,625 describes mixtures of opaque DPP pigments and salt-forming azo pigments for automotive paint applications.

EP-A-1 715 007 describes the use of disazo condensation dispersants based on C.I. Pigment Red 242 for use in color filters.

US 2006 185558 A describes the use of a mixture of DPP pigments having a sulfonic acid group, DPP pigments having no sulfonic acid group and disazo condensation dispersants based on C.I. Pigment Red 242 for use in color filters.

It is an object of the present invention to provide a diketopyrrolopyrrole pigment composition particularly for color filter applications which has good dispersibility in organic coating systems, a fine state of subdivision of the pigment crystals with a narrow particle size distribution, a high recrystallization stability during comminution, a high heat stability as well as high cleanness of hue, brilliance and contrast value.

We have found that this object is achieved, surprisingly, by a mixture having a certain mixing ratio of bis(4-chlorophenyl)diketopyrrolopyrrole (I), (4-chlorophenyl)-(X-biphenyl)diketopyrrolopyrrole (II) and bis(X-biphenyl)diketopyrrolopyrrole (III) and also its process of production.

The present invention provides a pigment composition of compounds of the formulae (I), (II) and (III), characterized by a median particle size $d_{50}$ in the range from 10 to 60 nm, preferably in the range from 15 to 50 nm, less than 5% by volume of the particles being greater than 70 nm,

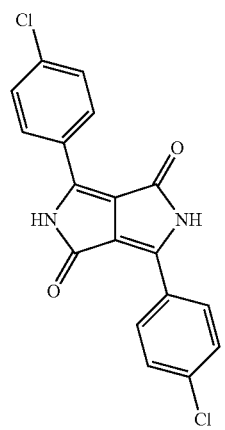

(I)

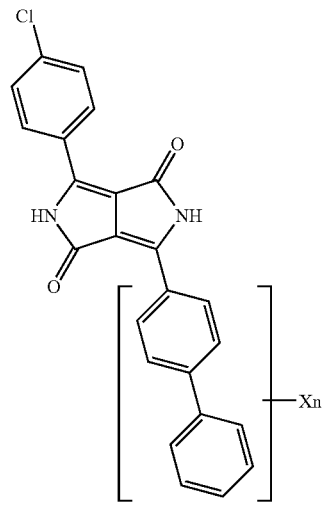

(II)

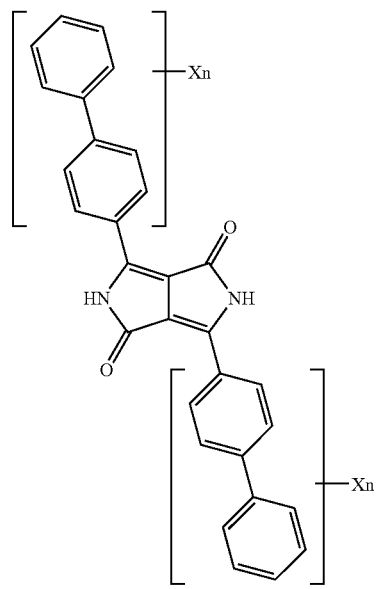

(III)

obtainable by reaction of 1 mol of a succinic diester with 2 mol of a mixture of nitriles A-CN and B-CN, the molar ratio of A-CN and B-CN in the nitrile mixture being in the range from 99.5:0.5 to 85:15, preferably in the range from 98:2 to 90:10 and in particular in the range from 97:3 to 93:7, relative to each other, A-CN being 4-chlorobenzonitrile and B-CN being a nitrile of the formula (IV)

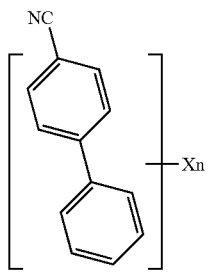

(IV)

where n is a number from 0 to 4, preferably 0 to 2, in particular zero; and

X is OH, F, CL, Br, CN, $CF_3$, nitro, $C_1$-$C_8$-alkyl, $C_5$-$C_7$-cycloalkyl, $C_2$-$C_8$-alkenyl, $C_1$-$C_8$-alkoxy, phenyl, benzyl.

The particle size distribution of the pigment composition of the present invention preferably approximates a Gaussian distribution in which the standard deviation sigma is preferably less than 30 nm and more preferably less than 20 nm. The standard deviations are in general between 5 and 30 nm, preferably between 6 and 25 nm and in particular between 7 and 20 nm.

The standard deviation sigma ($\sigma$) corresponds to the positive square root of the variance. The variance v is the sum total of the squared deviations from the mean, divided by the number of samples minus 1.

The pigment composition of the present invention is further characterized by a $d_{95}$ value of not more than 70 nm.

The length to width ratio of the pigment particles of the pigment composition of the present invention is preferably between 2:1 and 1:1.

The present invention also provides a process for producing the pigment compositions of the present invention by reaction of succinic diesters with 4-chlorobenzonitrile and a nitrile of the formula (IV) in the aforementioned quantitative ratios, in an organic solvent, in the presence of a strong base and at elevated temperature to form a pigment alkali metal salt, subsequent hydrolysis of the pigment alkali metal salt in water and/or alcohol and subsequent conversion into a fine state of subdivision by salt kneading.

It is particularly surprising that the pigment compositions of the present invention, unlike pure P.R. 254, remain recrystallization-stable even at high temperatures during the conversion into a fine state of subdivision by salt kneading; i.e., the particle growth which is otherwise customary in a finishing operation does not take place and therefore the presence of a crystal growth inhibitor is redundant.

The overall concentration of the nitriles in the organic solvent is advantageously 0.5 to 5 mol/l. The molar ratio of the strong base to the succinic diester is advantageously 0.1 to 10 mol of base per 1 mol of succinic diester.

The reaction temperature to form the pigment alkali metal salt is advantageously 60 to 140° C. and preferably 80 to 120° C.

The succinic diesters to be used can be dialkyl, diaryl or monoalkyl monoaryl esters, and the dialkyl and diaryl succinates may likewise be asymmetrical. Preference is given to symmetrical succinic diesters, in particular symmetrical dialkyl succinates. Examples of suitable succinic diesters are described in EP-A-0 640 603. The reaction of the succinic diester with the nitriles is carried out in an organic solvent. Suitable solvents are for example primary, secondary or tertiary alcohols having 1 to 10 carbon atoms, preferably tert-butanol and tert-amyl alcohol. Examples of suitable solvents are described in EP-A-0 640 603. The pigment alkali metal salt is prepared in the presence of a strong base. Suitable strong bases are in particular the alkali metal salts themselves, such as lithium, sodium or potassium, or alkali metal amides, such as lithium-, sodium- or potassium amide, or alkali metal hydrides, such as lithium, sodium or potassium hydride, or alkaline earth metal or alkali metal alkoxides derived in particular from primary, secondary or tertiary aliphatic alcohols having 1 to 10 carbon atoms, such as for example lithium methoxide, sodium methoxide, potassium methoxide, lithium ethoxide, sodium ethoxide, potassium ethoxide, lithium n-propoxide, sodium n-propoxide, potassium n-propoxide, lithium isopropoxide, sodium isopropoxide, potassium isopropoxide, lithium n-butoxide, sodium n-butoxide, potassium n-butoxide, lithium sec-butoxide, sodium sec-butoxide, potassium sec-butoxide, lithium tert-butoxide, sodium tert-butoxide, potassium tert-butoxide, lithium 2-methyl-2-butoxide, sodium 2-methyl-2-butoxide, potassium 2-methyl-2-butoxide, lithium 2-methyl-2-pentoxide, sodium 2-methyl-2-pentoxide, potassium 2-methyl-2-pentoxide, lithium 3-methyl-3-pentoxide, sodium 3-methyl-3-pentoxide, potassium 3-methyl-3-pentoxide, lithium 3-ethyl-3-pentoxide, sodium 3-ethyl-3-pentoxide or potassium 3-ethyl-3-pentoxide. Mixtures of the bases mentioned can also be used.

Preference is given to alkali metal alkoxides where alkali metal is in particular sodium or potassium and the alkoxide preferably derives from a secondary or tertiary alcohol. Particularly preferred strong bases are therefore for example sodium isopropoxide, potassium isopropoxide, sodium sec-butoxide, potassium sec-butoxide, sodium tert-butoxide, potassium tert-butoxide, sodium tert-amoxide and potassium tert-amoxide. The alkali metal alkoxides can also be prepared in situ by reacting the appropriate alcohol with the alkali metal, alkali metal hydride or alkali metal amide.

The preparation of the sodium or potassium amoxide can be speeded by addition of heavy metals and heavy metal salts, such as iron, cobalt, nickel, zinc or tin (similarly to EP-B1-1 086 067).

To hydrolyze the pigment alkali metal salt, water or one or more organic protic solvents can be used as a hydrolyzing agent. Useful protic solvents include for example alcohols, preferably having 1 to 4 carbon atoms, such as methanol or ethanol. It is also possible to use water and alcohol in any desired combination. The hydrolysis can also be carried out in the presence of organic aprotic solvents. The hydrolysis can be accomplished directly by addition of a hydrolyzing agent to the reaction suspension, or indirectly, by addition of the reaction suspension to the hydrolyzing agent. The hydrolyzing agents water and organic protic solvent can be added and/or initially charged in any desired order and also as mixtures.

Concurrent addition of individual components to an initial charge is also possible. It can be of advantage to use a buffer during the hydrolysis, for example a phosphate, acetate, citric acid or triethanolamine buffer. The temperature at which the hydrolysis is carried out can be in the range from −20° C. to 200° C., preferably in the range from −5 to 180° C. and in particular in the range from 0 to 160° C., if necessary under superatmospheric pressure. The reaction suspension and the hydrolyzing agent can also have different temperatures. For example, the hydrolysis can also be accomplished by means of steam. The total amount of hydrolyzing agent is advantageously an at least stoichiometric amount based on base. For example, water and/or an organic protic solvent can be used at between 0.5 and 50 parts by weight per 1 part of the pigment formed.

Conversion into a fine state of subdivision utilizes salt kneading with a crystalline inorganic salt in the presence of an organic solvent. As crystalline inorganic salt there may be used for example aluminum sulfate, sodium sulfate, calcium chloride, potassium chloride or sodium chloride, preferably sodium sulfate, sodium chloride and potassium chloride.

As organic solvent there may be used for example ketones, esters, amides, sulfones, sulfoxides, nitro compounds, mono-, bis- or tris-hydroxy $C_2$-$C_{12}$-alkanes which may be substituted with $C_1$-$C_8$-alkyl and one or more hydroxyl groups. Particular preference is given to water-miscible high-boiling organic solvents based on monomeric, oligomeric and polymeric $C_2$-$C_3$-alkylene glycols, for example diethylene glycol, diethylene glycol monomethyl ether, diethylene glycol monoethyl ether, triethylene glycol, triethylene glycol monomethyl ether, triethylene glycol monoethyl ether, dipropylene glycol, dipropylene glycol monomethyl ether, dipropylene glycol monoethyl ether, propylene glycol monomethyl ether, propylene glycol monoethyl ether and liquid polyethylene and polypropylene glycols, N-methylpyrrolidone and also triacetin, dimethylformamide, dimethylacetamide, ethyl methyl ketone, cyclohexanone, diacetone alcohol, butyl acetate, nitromethane, dimethyl sulfoxide and sulfolane.

The weight ratio between the inorganic salt and the pigment is preferably (2 to 10):1, in particular (3 to 7):1.

The weight ratio between the organic solvent and the inorganic salt is preferably in the range from (1 ml:10 g) to (2 ml:7 g).

The weight ratio between the organic solvent and the sum total of inorganic salt and pigment is preferably in the range from (1 ml:2 g) to (1 ml:10 g).

The temperature during the kneading operation can be between 40 and 140° C., preferably 60 to 120° C. The kneading time is advantageously 4 h to 32 h, preferably 8 h to 20 h.

After the salt-kneading operation, the inorganic salt and the organic solvent are advantageously removed by washing with water and the pigment composition thus obtained is dried in a conventional manner.

The material obtained after the present invention conversion into a fine state of subdivision, as a suspension, filter cake or dry material, may optionally be subjected to a solvent aftertreatment to obtain a more homogeneous particle form without significantly increasing the particle size. Preference is given to the use of water or steam-volatile solvents such as alcohols and aromatic solvents, more preferably branched or unbranched $C_1$-$C_6$-alcohols, toluene, xylene, chlorobenzene, dichlorobenzene, nitrotoluene or nitrobenzene usually under elevated temperature, for example up to 200° C., and if necessary under elevated pressure.

The present invention further provides a pigment preparation of pigments of the formulae (I), (II) and (III), characterized by a median particle size $d_{50}$ in the range from 10 to 60 nm, preferably in the range from 15 to 50 nm, less than 5% by volume of the particles being greater than 70 nm

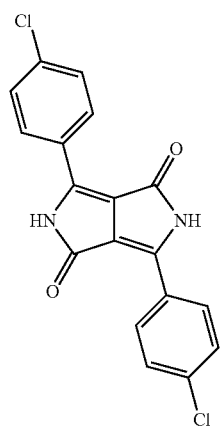

(I)

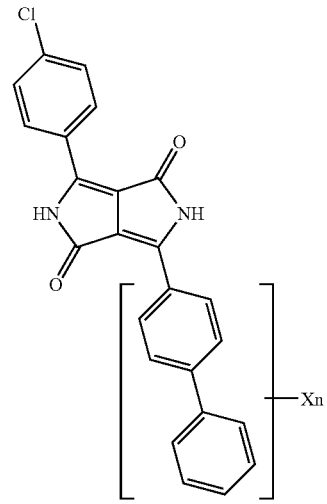

(II)

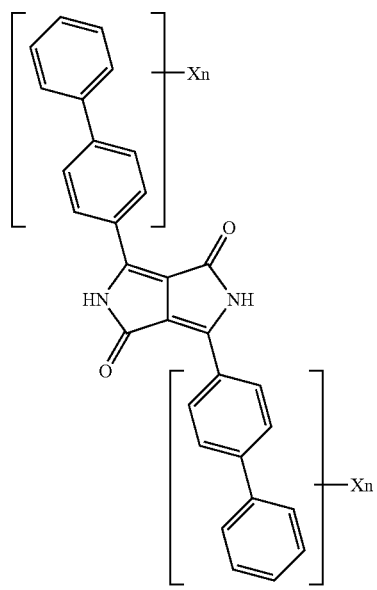

(III)

where
n is a number from 0 to 4, preferably 0 to 2, in particular zero; and
X is OH, F, Cl, Br, CN, $CF_3$, nitro, $C_1$-$C_8$-alkyl, $C_5$-$C_7$-cycloalkyl, $C_2$-$C_8$-alkenyl, $C_1$-$C_8$-alkoxy, phenyl, benzyl; and by at least one dispersant from the group of the unlaked sulfo-containing monoazo dyes.

The relative proportion of the pigments of the formulae (I), (II) and (III) to each other is preferably 99.5 to 70:0.1 to 30:0.1 to 15%, in particular 98 to 85:1 to 15:0.1 to 7.5%.

The pigment mixture (I), (II) and (III) can be produced either by mixing the individual components or preferably by mixed synthesis, as described above. The starting compounds, solvents, reagents and process conditions used for preparing the diketopyrrolopyrrole pigments are known to the skilled person from the prior art mentioned at the beginning.

The dispersants from the group of the unlaked sulfo-containing monoazo dyes preferably comprise compounds of the formula (IV), (V), (VI) or (VII)

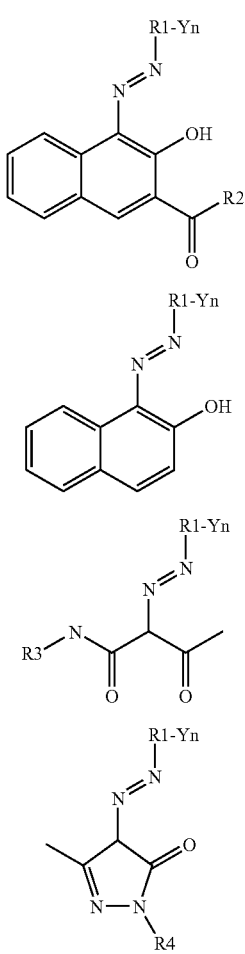

where
R1 is an aromatic radical having 1, 2 or 3 aromatic rings, the rings being fused or linked by a bond, or is a heterocyclic radical having 1, 2 or 3 rings containing 1, 2, 3 or 4 heteroatoms from the group consisting of O, N and S; or a combination thereof;
where the aromatic and heteroaromatic radicals mentioned may be substituted by 1, 2, 3 or 4 substituents from the group consisting of OH, CN, F, Cl, Br, $NO_2$, $CF_3$, $C_1$-$C_6$-alkoxy, S—$C_1$-$C_6$-alkyl, $NHCONH_2$, $NHC(NH)NH_2$, NHCO—$C_1$-$C_6$-alkyl, $C_1$-$C_6$-alkyl, COOR5, CONR5R6, NR5R6, $SO_3$R5, $SO_2$—NR5R6 and COO$^-$E$^+$, where R5 and R6 are the same or different and are each hydrogen, phenyl or $C_1$-$C_6$-alkyl and E$^+$ is hydrogen, lithium, sodium, potassium, rubidium, cesium or an unsubstituted ammonium ion;

Y is $SO_3^-$E$^+$ or Z—$SO_3^-$E$^+$, where Z is $C_1$-$C_{10}$-alkylene or phenylene;

n is a number from 1, 2 or 3;

R2 is —OR$^8$ or —NHR$^8$,
where R$^8$ is H, $C_1$-$C_6$-alkyl, benzyl, an aromatic radical having 1, 2 or 3 aromatic rings, the rings being fused or linked by a bond, or is a heterocyclic radical having 1, 2 or 3 rings containing 1, 2, 3 or 4 heteroatoms from the group consisting of O, N and S; or a combination thereof;
where the aromatic and heteroaromatic radicals mentioned may each be substituted by 1, 2, 3 or 4 substituents from the group consisting of OH, $C_1$-$C_6$-alkoxy, S—$C_1$-$C_6$-alkyl, halogen, such as F, Cl, Br, $NHCONH_2$, NHC(NH)$NH_2$, NHCO—$C_1$-$C_6$-alkyl, $C_1$-$C_6$-alkyl, nitro, COOR$^5$, CONR$^5$R$^6$, $SO_3$R$^5$, $SO_2$—NR5R6, NR$^9$R$^{10}$, $SO_3^-$E$^+$ and COO$^-$E$^+$, where R5 and R6 are the same or different and are each hydrogen, phenyl or $C_1$-$C_6$-alkyl; R$^9$ and R$^{10}$ are the same or different and are each hydrogen, phenyl or $C_1$-$C_6$-alkyl;

R3 and R4 are each an aromatic radical having 1, 2 or 3 aromatic rings, the rings being fused or linked by a bond, or a heterocyclic radical having 1, 2 or 3 rings containing 1, 2, 3 or 4 heteroatoms from the group consisting of O, N and S; or a combination thereof;
where the aromatic and heteroaromatic radicals mentioned may each be substituted by 1, 2, 3 or 4 substituents from the group consisting of OH, $C_1$-$C_6$-alkoxy, S—$C_1$-$C_6$-alkyl, halogen, such as F, Cl, Br, $NHCONH_2$, NHC(NH)$NH_2$, NHCO—$C_1$-$C_6$-alkyl, $C_1$-$C_6$-alkyl, nitro, COOR5, CONR5R6, $SO_3$R5, $SO_2$—NR5R6, NR$^9$R$^{10}$, $SO_3^-$E$^+$ and COO$^-$E$^+$, where R5 and R6 are the same or different and are each hydrogen, phenyl or $C_1$-$C_6$-alkyl; R$^9$ and R$^{10}$ are the same or different and are each hydrogen, phenyl or $C_1$-$C_6$-alkyl.

In the monoazo dyes, the radical —R1-Yn has the following preferred meanings in which the free valency on the phenyl ring or naphthyl ring represents the bond to the diazo group:

(i) from the group of the p-aminobenzenesulfonic acids:

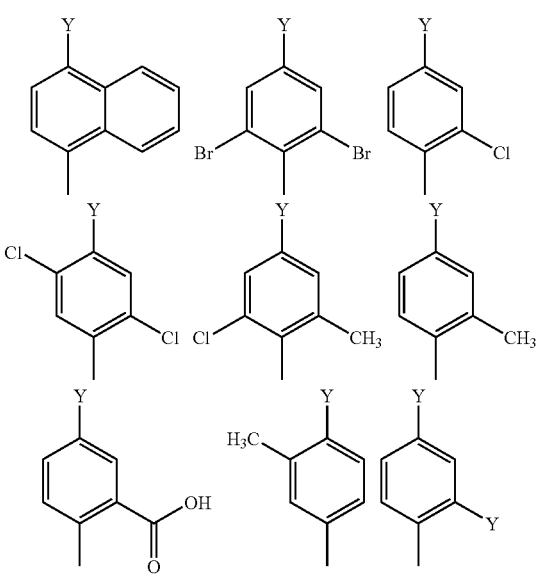

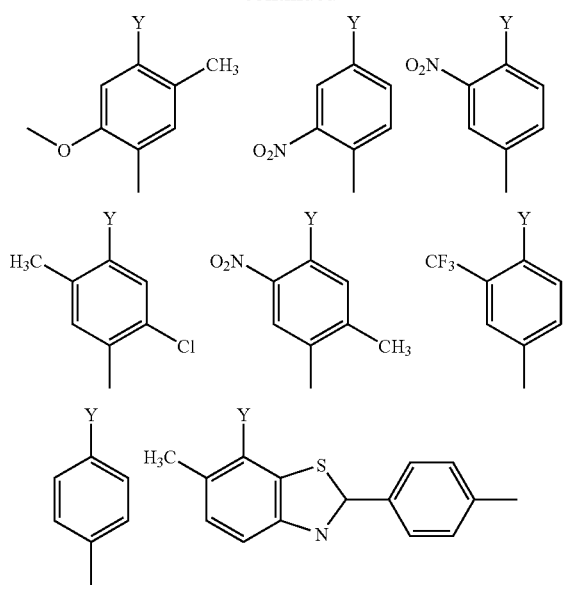
(ii) from the group of the m-aminobenzenesulfonic acids:
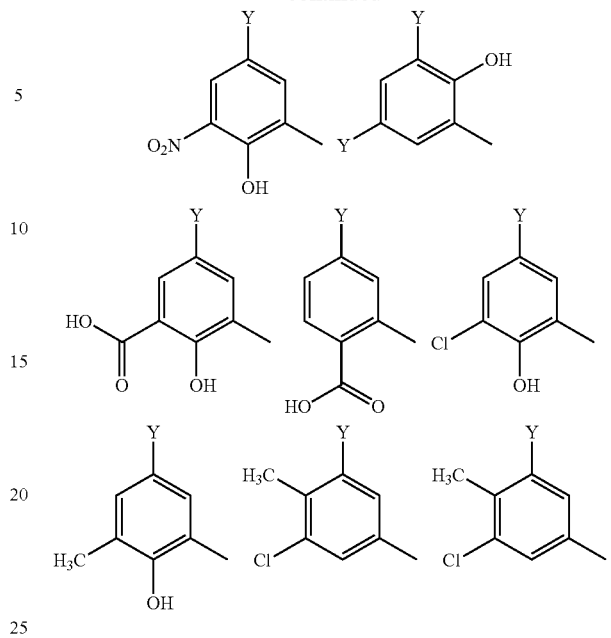
(iii) from the group of the o-aminobenzenesulfonic acids:
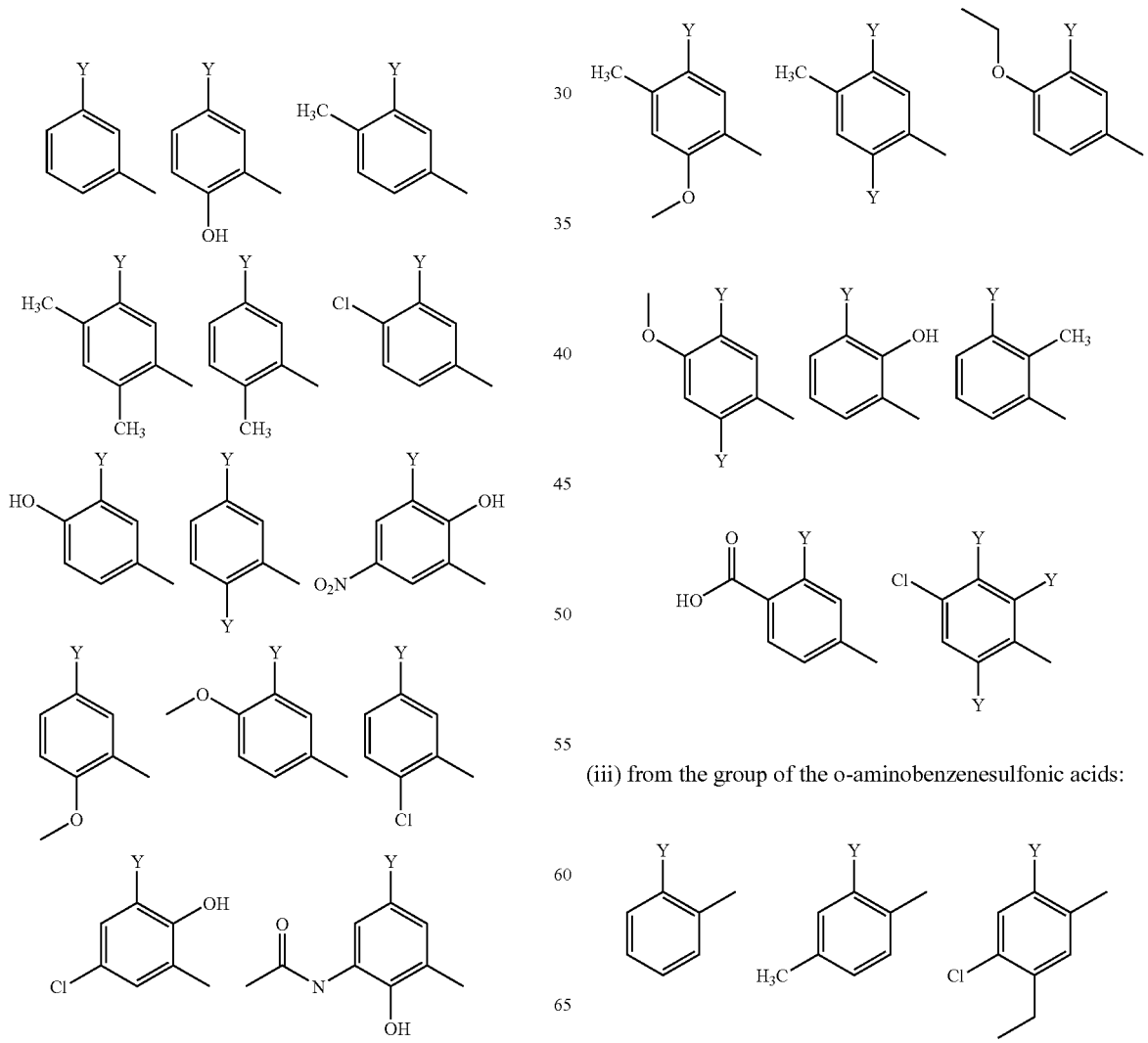

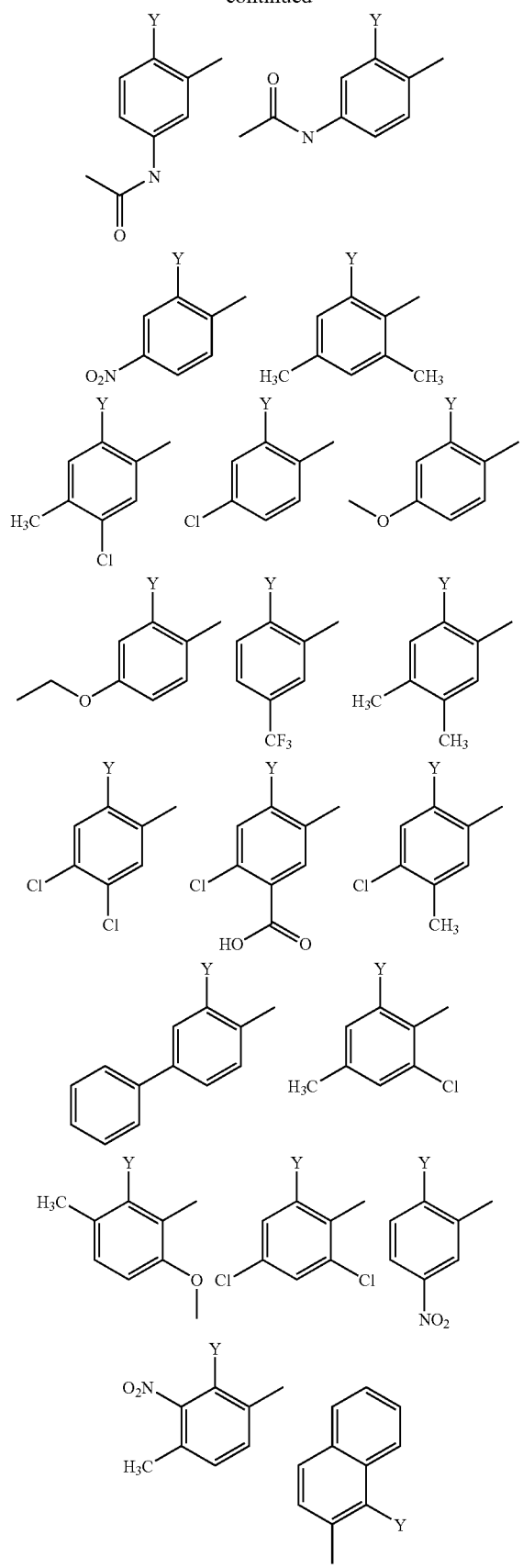
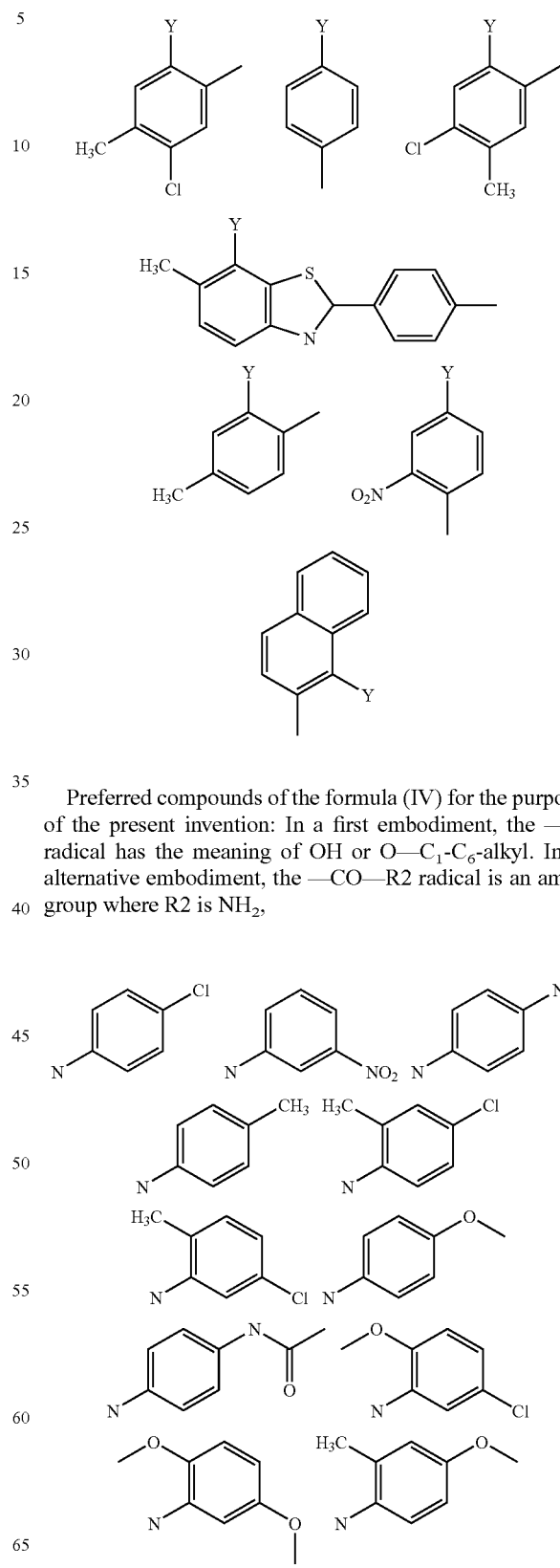
Particularly preferred radicals from the —R1-Yn group are:
Preferred compounds of the formula (IV) for the purposes of the present invention: In a first embodiment, the —R2 radical has the meaning of OH or O—$C_1$-$C_6$-alkyl. In an alternative embodiment, the —CO—R2 radical is an amide group where R2 is $NH_2$,

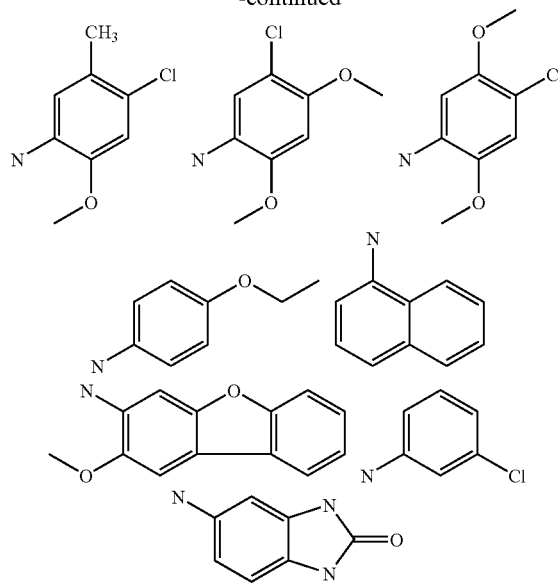

where the bond to the carbonyl group in the above formulae is via the free amino group (N—) of the aromatic ring.

Particularly preferred radicals from the —R2 group are: OH on the one hand and also

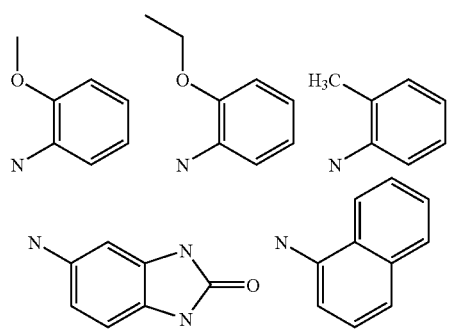

Preferred compounds of the formula (VI) for the purposes of the present invention are those having the following —R3 radicals in which the free valency on the phenyl ring represents the bond to the nitrogen:

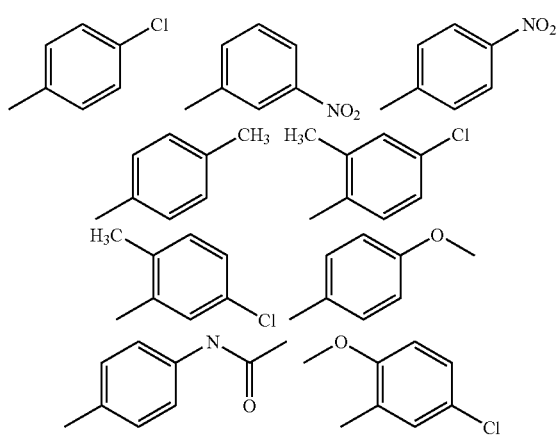

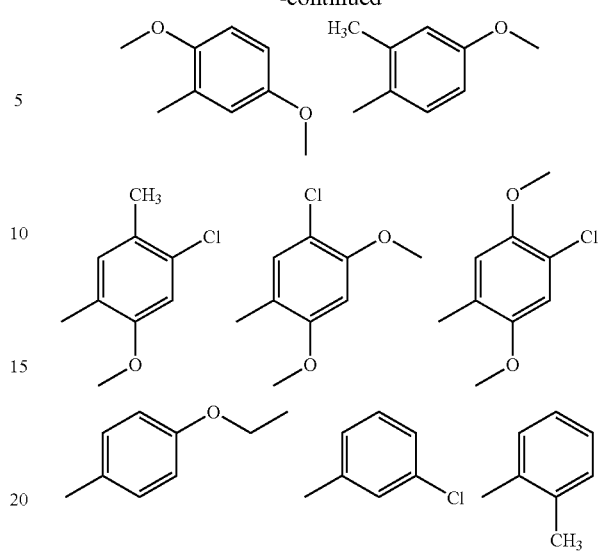

Particularly preferred radicals form the —R3 group are:

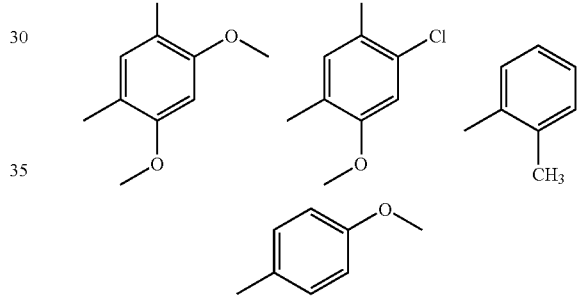

Preferred compounds of the formula (VII) for the purposes of the present invention are those having the following —R4 radicals in which the free valency on the phenyl ring represents the bond to the nitrogen:

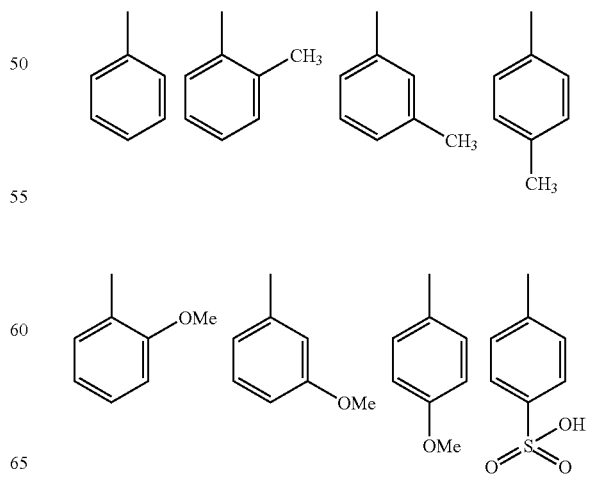

Particularly preferred radicals from the —R4 group are
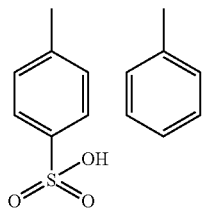
Very particular preference is given to the monoazo dyes of the formulae:
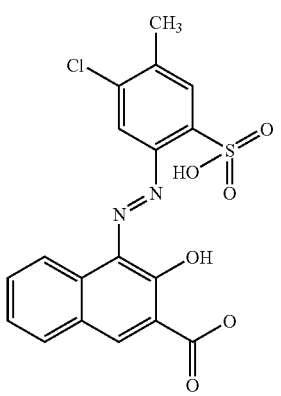
(VIII)
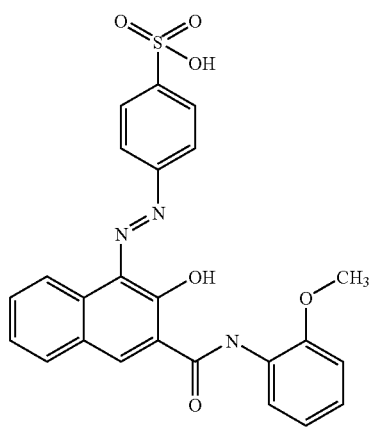
(IX)
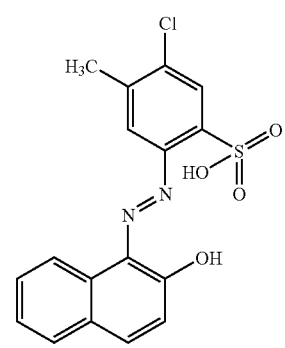
(X)
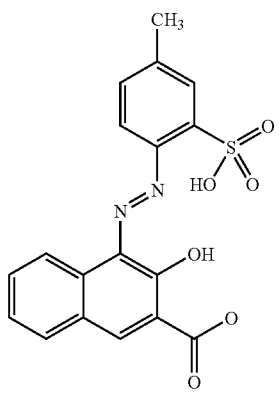
(XI)
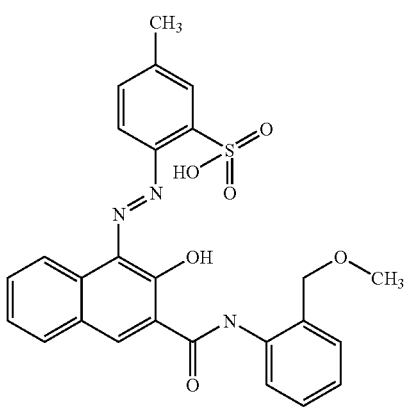
(XII)
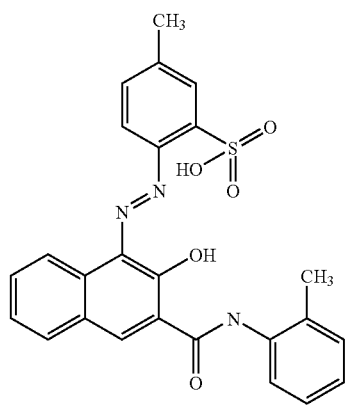
(XIII)

(XIV)
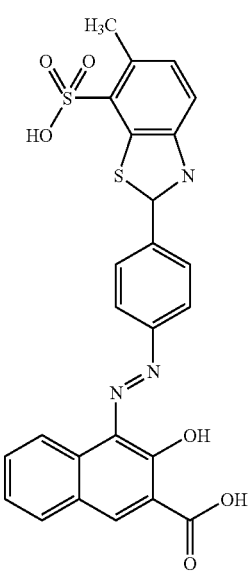
(XV)
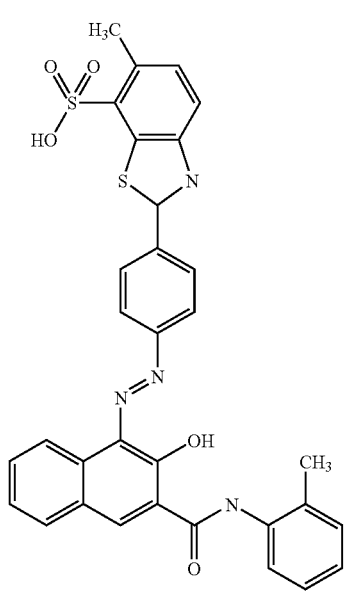
(XVI)
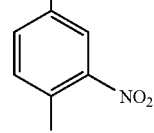
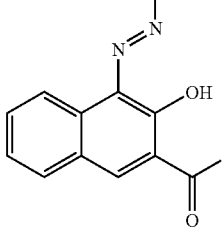
(XVII)
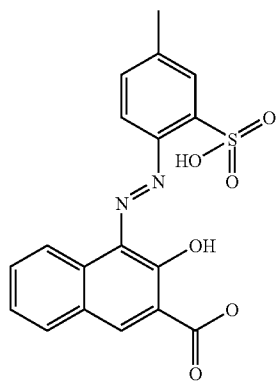
(XVIII)
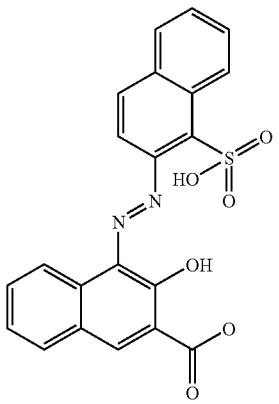
(XIX)
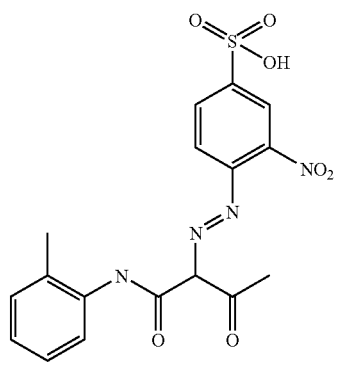
(XX)
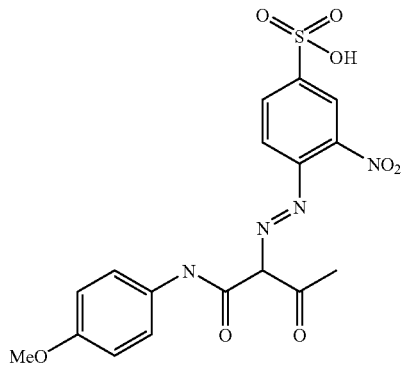

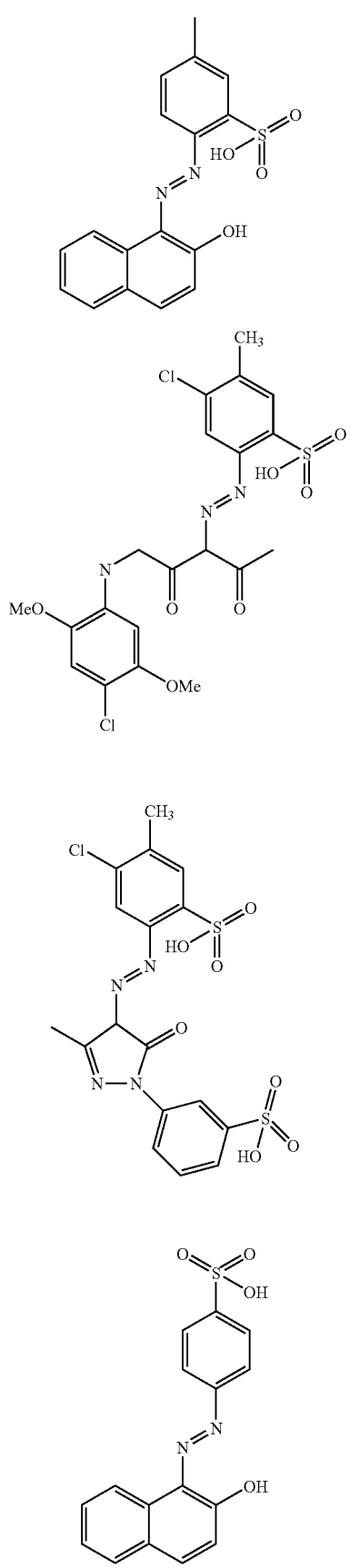
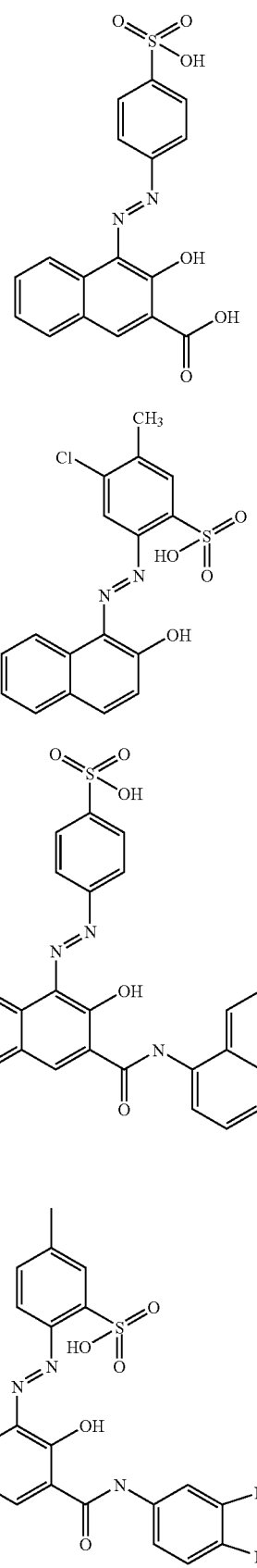

The unlaked sulfo-containing monoazo dyes are known compounds and can be prepared according to known methods by diazotization and azo coupling.

The pigment composition of the present invention may additionally contain further customary auxiliaries or additives, for example surfactants, dispersants, fillers, standardizers, resins, waxes, defoamers, dustproofers, extenders, antistats, preservatives, dryness retarders, wetters, antioxidants, UV absorbers and light stabilizers, preferably in an amount of 0.1% to 15% by weight, in particular 0.5% to 10% by weight, based on the total weight of the pigment composition.

Preferred dispersants are the pigment dispersants of the formula (5) or (6)

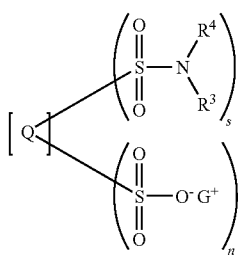

where

Q is a residue of an organic pigment from the group of the perinone pigments, quinacridone pigments, quinacridone-quinone pigments, anthanthrone pigments, indanthrone pigments, dioxazine pigments, for example triphendioxazines, diketopyrrolopyrrole pigments, indigo pigments, thioindigo pigments, thiazineindigo pigments, isoindoline pigments, isoindolinone pigments, pyranthrone pigments, isoviolanthrone pigments, flavanthrone pigments or anthrapyrimidine pigments;

s is a number from 1 to 5, preferably 1 to 3;

n is a number from 0 to 4, preferably 0.1 to 2; the sum total of s and n being 1 to 5;

$R^3$ is a branched or unbranched, saturated or unsaturated, aliphatic hydrocarbyl radical having 1 to 20 carbon atoms, or is a $C_5$-$C_7$-cycloalkyl radical, or is an araliphatic or aromatic radical having 1, 2 or 3 aromatic rings, the rings being fused or linked by a bond, or is a heterocyclic radical having 1, 2 or 3 rings containing 1, 2, 3 or 4 heteroatoms from the group consisting of O, N and S, or a combination thereof; where the hydrocarbyl, cycloalkyl, aromatic, araliphatic and heteroaromatic radicals mentioned may be substituted by 1, 2, 3 or 4 substituents from the group consisting of OH, CN, F, Cl, Br, $NO_2$, $CF_3$, $C_1$-$C_6$-alkoxy, S—$C_1$-$C_6$-alkyl, $NHCONH_2$, $NHC(NH)NH_2$, NHCO—$C_1$-$C_6$-alkyl, $C_1$-$C_6$-alkyl, $COOR^5$, $CONR^5R^6$, $NR^5R^6$, $SO_3R^5$, $SO_2$—$NR^5R^6$, $SO_3^-E^+$ and $COO^-E^+$, where $R^5$ and $R^6$ are the same or different and are each hydrogen, phenyl or $C_1$-$C_6$-alkyl;

$R^4$ is hydrogen or $R^3$;

$E^+$, $G^+$ are independently $H^+$ or the equivalent $M^{p+}/m$ of a metal cation $M^{p+}$ from the 1st to 5th main group or from the 1st or 2nd or 4th to 8th transition group of the periodic table, where m is one of the numbers 1, 2 or 3 and p is 1, 2 or 3;

or a substituted or unsubstituted ammonium ion;

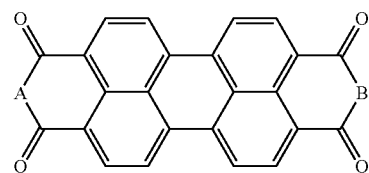

where

A is a bivalent radical —O—, —$NR^3$—, —$NR^{16}$—$SO_3^-G^+$,

B is a bivalent radical —$NR^{16}$—$SO_3^-G^+$, where $R^{16}$ is a straight-chain or branched $C_1$-$C_6$-alkylene chain and $R^3$ and $G^+$ are each as defined above.

In preferred pigment dispersants of the formula (5)

Q is the residue of an organic pigment from the group of the quinacridone, dioxazine or diketopyrrolopyrrole pigments;

$R^3$ is $C_1$-$C_6$-alkyl, benzyl, phenyl, which may each be substituted by 1, 2, 3 or 4 substituents from the group consisting of OH, $C_1$-$C_6$-alkoxy, S—$C_1$-$C_6$-alkyl, $NHCONH_2$, NHC(NH)$NH_2$, NHCO—$C_1$-$C_6$-alkyl, $C_1$-$C_6$-alkyl, $COOR^5$, $CONR^5R^6$, $NR^5R^6$, $SO_3R^5$, $SO_2$—$NR^5R^6$, $SO_3^-E^+$ and $COO^-E^+$, where $R^5$ and $R^6$ are the same or different and are each hydrogen, phenyl or $C_1$-$C_6$-alkyl;

$R^4$ is hydrogen.

$E^+$ and $G^+$ are each hydrogen, an alkaline earth metal, an alkali metal or a metal of the third main group, in particular Li, Na, K. Ca, Sr, Ba, Al or an ammonium ion.

In particularly preferred pigment dispersants of the formula (5)

Q is a residue of an organic pigment from the group of the diketopyrrolopyrrole pigments, preferably C.I. Pigment Red 255 or 264;

$R^3$ is $C_1$-$C_6$-alkyl which may be substituted by 1, 2, 3 or 4 substituents from the group consisting of $NHCONH_2$, NHC(NH)$NH_2$, NHCO—$C_1$-$C_6$-alkyl, $COOR^5$, $NR^5R^6$, $COO^-E^+$, where $R^5$ and $R^6$ are the same or different and are each hydrogen, phenyl or $C_1$-$C_6$-alkyl;

$R^4$ is hydrogen, $E^+$ and $G^+$ are each hydrogen, an alkaline earth metal, an alkali metal or a metal of the third main group, in particular Li, Na, K, Ca, Sr, Ba, Al or an ammonium ion.

In preferred pigment dispersants of the formula (6)

A is a bivalent radical —$NR^3$— and

B has the above preferred meanings, $G^+$ is hydrogen or an alkali metal, in particular Li, Na or K.

Particularly preferred pigment preparations for the purposes of the present invention contain a basic pigment dispersant of the formula (29)

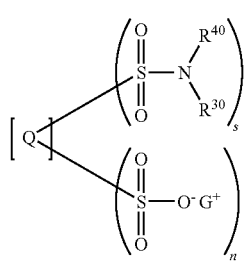

where

Q is a residue of an organic pigment from the group of the perinone pigments, quinacridone pigments, quinacridonequinone pigments, anthanthrone pigments, indanthrone pigments, dioxazine pigments, for example triphendioxazines, diketopyrrolopyrrole pigments, indigo pigments, thioindigo pigments, thiazineindigo pigments, isoindoline pigments, isoindolinone pigments, pyranthrone pigments, isoviolanthrone pigments, flavanthrone pigments or anthrapyrimidine pigments;

s is a number from 1 to 5, preferably 1 to 3;

n is a number from 0 to 4, preferably 0.1 to 2; the sum total of s and n being 1 to 5 and s being greater than n;

$R^{30}$ is a branched or unbranched, saturated or unsaturated, aliphatic hydrocarbyl radical having 1 to 20 carbon atoms, or is a $C_5$-$C_7$-cycloalkyl radical, or is an araliphatic or aromatic radical having 1, 2 or 3 aromatic rings, the rings being fused or linked by a bond, or is a heterocyclic radical having 1, 2 or 3 rings containing 1, 2, 3 or 4 heteroatoms from the group consisting of O, N and S, or a combination thereof; where the hydrocarbyl, cycloalkyl, aromatic, araliphatic and heteroaromatic radicals mentioned may be substituted by 1, 2, 3 or 4 substituents from the group consisting of OH, CN, F, Cl, Br, $NO_2$, $CF_3$, $C_1$-$C_6$-alkoxy, S—$C_1$-$C_6$-alkyl, $NHCONH_2$, $NHC(NH)NH_2$, NHCO—$C_1$-$C_6$-alkyl, $C_1$-$C_6$-alkyl, $CONR^5R^6$, $NR^5R^6$, where $R^5$ and $R^6$ are the same or different and are each hydrogen, phenyl or $C_1$-$C_6$-alkyl;

$R^{40}$ is hydrogen or $R^{30}$;

$G^+$ is $H^+$, an alkali metal or a substituted or unsubstituted ammonium ion.

In preferred pigment dispersants of the formula (29)

Q is a residue of an organic pigment from the group of the quinacridone, dioxazine or diketopyrrolopyrrole pigments;

$R^{30}$ is $C_1$-$C_6$-alkyl, benzyl, phenyl, which may each be substituted by 1, 2, 3 or 4 substituents from the group consisting of OH, $C_1$-$C_6$-alkoxy, S—$C_1$-$C_6$-alkyl, $NHCONH_2$, $NHC(NH)NH_2$, NHCO—$C_1$-$C_6$-alkyl, $CONR^5R^6$, $NR^5R^6$, where $R^5$ and $R^6$ are the same or different and are each hydrogen, phenyl or $C_1$-$C_6$-alkyl;

$R^{40}$ is hydrogen, $G^+$ is hydrogen, Li, Na, K or an ammonium ion.

In particularly preferred pigment dispersants of the formula (29)

Q is a residue of an organic pigment from the group of the diketopyrrolopyrrole pigments, preferably C.I. Pigment Red 255 or 264, or of the quinacridone pigments, preferably C.I. Pigment Violet 19 or Pigment Red 122;

$R^{30}$ is $C_1$-$C_6$-alkyl which is substituted by $NR^5R^6$, where $R^5$ and $R^6$ are the same or different and are each hydrogen or $C_1$-$C_6$-alkyl;

$R^{40}$ is hydrogen, $G^+$ is hydrogen, Li, Na, K or an ammonium ion.

The proportion of pigment dispersants of the formula (29) is preferably between 0% and 30% by weight and more preferably between 1% and 25% by weight, based on the mixture used of the pigments of the formulae (I) to (III).

The proportion of unlaked sulfo-containing monoazo dye is preferably between 1% and 30% by weight and more preferably between 2% and 25% by weight, based on the mixture used of the pigments of the formulae (I) to (III).

Particularly preferred pigment preparations contain 1% to 25% by weight and in particular 5% to 15% by weight of the unlaked sulfo-containing monoazo dye, and 1% to 25% by weight and in particular 5% to 15% by weight of the pigment dispersant of the formula (29), based on the mixture used of the pigments of the formulae (I) to (III).

The weight ratio between the pigment dispersants of the formula (29) and the monoazo dyes is preferably about 1:1, i.e., in the range from 1:0.8 to 1.2.

The pigment dispersants of the formulae (5) and (29) are known compounds and are obtainable by known methods, for example as described in EP-A-1 104 789 or DE-A-3 106 906.

The pigment dispersants of the formula (6) are known compounds and are obtainable by known methods, for example as described in U.S. Pat. No. 5,466,807.

Useful surfactants include customary anionic, cationic, nonionic or amphoteric substances or mixtures thereof.

The present invention also provides a process for producing the above-described preferred pigment preparations, which comprises the mixture of the compounds of the formulae (I), (II) and (III) being admixed with the unlaked sulfo-containing monoazo dye and optionally the pigment dispersant of the formula (29) before, during and/or after a conversion into a fine state of subdivision, as for example by kneading, wet-grinding, dry-grinding, or during and/or after a finishing treatment. Addition during conversion into a fine state of subdivision is preferred.

The respective components can be used in dry form as for example in pellet or powder form, or in moist form, as for example as a press cake.

A preferred form of conversion into a fine state of subdivision is salt kneading with a crystalline inorganic salt in the presence of an organic solvent, as described above.

The pigment compositions of the present invention are useful in principle for pigmentation of all macromolecular organic materials of natural or synthetic origin, for example plastics, resins, coatings, in particular metallic coatings, paints, electrophotographic toners and developers, electret materials, color filters and also liquid inks, printing inks.

More particularly, the pigment compositions of the present invention provide hues in the red spectrum which are in demand for use in color filters. There, they provide high contrast and also meet the other requirements for use in color filters, such as high thermal stability or steep and narrow absorption bands.

More particularly, the pigment compositions of the present invention are also useful as colorants in inkjet inks on an aqueous or nonaqueous basis and also in inkjet inks of the hot-melt type.

The present invention accordingly also provides a macromolecular organic material comprising a coloristically effective amount of a pigment composition of the present invention.

Based on the macromolecular organic material to be pigmented, the pigment preparation of the present invention is usually used in an amount of 0.01% to 30% by weight and preferably 0.1% to 15% by weight. In the case of the use in color filters, higher amounts can also be used, as mentioned hereinbelow.

More particularly, the pigment compositions of the present invention are useful as colorants for color filters not only for additive color generation but also for subtractive color generation, as for example in electro-optical systems such as television screens, liquid crystal displays (LCDs), charge coupled devices, plasma displays or electroluminescent displays, which in turn can be active (twisted nematic) or passive (supertwisted nematic) ferroelectric displays or light-emitting diodes, and also as colorants for "electronic inks" ("e-inks") or "electronic paper" ("e-paper").

Color filters not only reflective but also transparent color filters, are produced by applying pigments in the form of a paste or as pigmented photoresists in suitable binders (acrylates, acrylic esters, polyimides, polyvinyl alcohols, epoxides, polyesters, melamines, gelatin, caseins) to the respective LCD components (for example TFT-LCD=Thin Film Transistor Liquid Crystal Displays or for example ((S) TN-LCD=(Super) Twisted Nematic-LCD). A high pigment purity is a prerequisite for a stable paste or a pigmented photoresist as well as high thermal stability.

In addition, the pigmented color filters can also be applied by inkjet printing processes or other suitable printing processes.

The red hues of the pigment compositions of the present invention are particularly useful for the red-green-blue (R, G, B) color filter color set. These three colors are side by side as disparate colored dots and produce a full color picture on illumination from behind.

Typical colorants for the blue color dot are phthalocyanine colorants or benzimidazolonedioxazine pigments such as, for example C.I. Pigment Blue 15:6 and C.I. Pigment Blue 80. The green color dot typically utilizes phthalocyanine colorants, for example C.I. Pigment Green 36 and C.I. Pigment Green 7.

The red hue is preferably blended from P.R. 254 and P.R. 177 or from P.R. 254 and P.R. 242.

If necessary, the respective color dots may be mixed with further colors for shading. The red and green hue is preferably admixed with yellow, for example with C.I. Pigment Yellow 138, 139, 150, 151, 180 and 213. The blue hue is preferably admixed with violet, for example with C.I. Pigment Violet 19 or 23.

The use concentration in the applied color filter film of the pigment compositions of the present invention can be between 5% and 95% by weight, preferably between 20% and 80% by weight and most preferably between 40% and 60% by weight, based on the total weight of the color filter film.

The present invention also provides a color filter comprising a coloristically effective amount of the pigment composition of the present invention.

In the examples which follow, percentages and parts are by weight, unless otherwise stated, mole percentages are based on total nitrile.

COMPARATIVE EXAMPLE 1

Similarly to Example 11 of EP-A-0 181 290

A pigment mixture is prepared as described in Example 11 of EP-A-0 181 290, from a mixture of 1.1 g of 4-cyanobiphenyl (3 mol %) and 26.7 g of 4-chlorobenzo-nitrile (97 mol %).

The red pigment obtained has a median particle size $d_{50}=85$ nm and a $d_{95}$ value of 150 nm with a standard deviation sigma ($\sigma$) of 31 nm.

Length to width ratio: 3.3:1.

COMPARATIVE EXAMPLE 2

Similarly to Example 12 of EP-A-0 181 290

A pigment mixture is prepared as described in Example 12 of EP-A-0 181 290, from a mixture of 1.8 g of 4-cyanobiphenyl (5 mol %) and 26.1 g of 4-chlorobenzo-nitrile (95 mol %).

The red pigment obtained has a median particle size $d_{50}=88$ nm and a $d_{95}$ value of 157 nm with a standard deviation $\sigma$ of 31 nm.

Length to width ratio: 3.3:1.

COMPARATIVE EXAMPLE 3

Similarly to Example 15 of EP-A-0 094 911

A pigment mixture is prepared on the lines of Example 15 of EP-A-0 094 911 from a mixture of 21.5 g of 4-cyanobiphenyl (50 mol %) and 16.5 g of 4-chlorobenzonitrile (50 mol %).

The red pigment obtained is subsequently subjected to a salt-kneading operation. To this end, 15 g of the dry pigment are kneaded with 90 g of sodium chloride and 22 ml of diethylene glycol at a temperature of 80° C. for 24 h. The kneaded dough is stirred into 0.9 l of 5% hydrochloric acid for two hours and the pigment is subsequently filtered off.

The filter cake is treated again for 1 h with 0.9 l of demineralized water with stirring. After filtration, the pigment is washed salt- and acid-free with water and dried under reduced pressure.

The pigment mixture obtained has a median particle size $d_{50}=52$ nm and a $d_{95}$ value of 101 nm with a standard deviation $\sigma$ of 22 nm.

COMPARATIVE EXAMPLE 4

A salt-kneading operation is carried out using pure P.R. 254 having a median particle size of above 200 nm, prepared on the lines of Example 1 of EP-A-0 190 999. To this end, 15 g of the dry pigment are kneaded with 90 g of sodium chloride and 22 ml of diethylene glycol at a temperature of 80° C. for 24 h. The kneaded dough is stirred into 0.9 l of 5% hydrochloric acid for two hours and the pigment is subsequently filtered off.

The filter cake is treated again for 1 h with 0.9 l of demineralized water with stirring. After filtration, the pigment is washed salt- and acid-free with water and dried under reduced pressure.

The pigment obtained has a median particle size $d_{50}=70$ nm and a $d_{95}$ value of 114 nm with a standard deviation $\sigma$ of 22 nm.

Length to width ratio: 1.5:1

EXAMPLE 1

In a flask, 1.6 g of 4-cyanobiphenyl (4 mol %) and 29.7 g of 4-chlorobenzonitrile (96 mol %) are introduced into sodium amoxide solution in tert-amyl alcohol (prepared from 9.3 g of sodium and 177 ml of tert-amyl alcohol) and heated to 100° C.

30 g of diisopropyl succinate are added during two hours. After a further four hours at 100° C., the pigment alkali metal salt suspension is cooled down to 80° C. and poured onto hot water at 60° C. The pigment suspension is for conditioning subsequently heated to 95° C. for five hours, filtered off, washed with methanol and water and dried in a drying cabinet at 75° C. A red pigment is obtained.

The red pigment obtained is subsequently subjected to a salt-kneading operation. To this end, 15 g of the dry pigment are kneaded with 90 g of sodium chloride and 22 ml of diethylene glycol at a temperature of 80° C. for 24 h. The kneaded dough is stirred into 0.9 l of 5% hydrochloric acid for two hours and the pigment is subsequently filtered off.

The filter cake is treated again for 1 h with 0.9 l of demineralized water with stirring. After filtration, the pigment is washed salt- and acid-free with water and dried under reduced pressure.

The pigment composition obtained has a median particle size $d_{50}=28$ nm and a $d_{95}$ value of 41 nm with a standard deviation $\sigma$ of 7 nm.

Length to width ratio: 1.4:1

EXAMPLE 2

Example 1 is repeated using 0.8 g of 4-cyanobiphenyl (2 mol %) and 30.3 g of 4-chlorobenzonitrile (98 mol %) in the synthesis, the product being salt kneaded and isolated as described there.

The pigment composition obtained has a median particle size $d_{50}=30$ nm and a $d_{95}$ value of 45 nm with a standard deviation $\sigma$ of 8 nm.

Length to width ratio: 1.3:1

EXAMPLE 3

Example 1 is repeated using 4.0 g of 4-cyanobiphenyl (10 mol %) and 27.9 g of 4-chlorobenzonitrile (90 mol %) in the synthesis, the product being salt kneaded and isolated as described there.

The pigment composition obtained has a median particle size $d_{50}=28$ nm and a $d_{95}$ value of 42 nm with a standard deviation $\sigma$ of 8 nm.

Length to width ratio: 1.3:1

EXAMPLE 4

A pigment composition is prepared similarly to Example 1 using 1.6 g of 4-cyanobiphenyl (4 mol %) and 29.7 g of 4 chlorobenzonitrile (96 mol %). The red pigment is subsequently subjected to a salt-kneading operation. To this end, 15 g of the dry pigment and 1.5 g of a pigment dispersant (8), prepared on the lines of Example 10a of EP-A-1 104 789, are kneaded with 90 g of sodium chloride and 22 ml of diethylene glycol at a temperature of 80° C. for 24 h. The kneaded dough is stirred in 0.9 l of 5% hydrochloric acid for two hours and the pigment is subsequently filtered off.

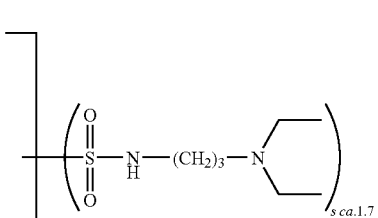

(8)

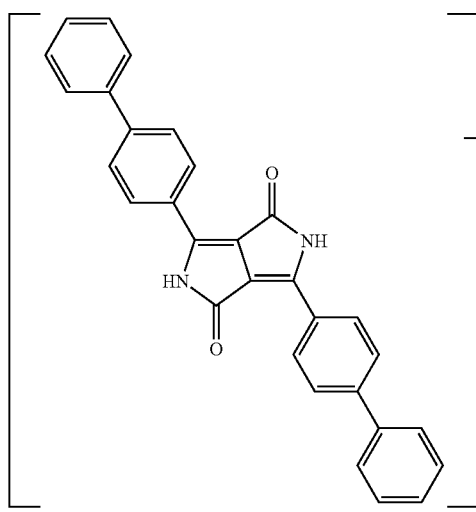

The filter cake is treated again for 1 h with 0.9 l of demineralized water with stirring. After filtration, the pigment is washed salt- and acid-free with water and dried under reduced pressure.

The red pigment composition obtained has a median particle size $d_{50}$=29 nm and a $d_{95}$ value of 45 nm with a standard deviation σ of 10 nm.

Length to width ratio: 1.5:1

EXAMPLE 5

Example 4 is repeated using in the kneading operation 1.5 g of a synergist (9) synthesized on the lines of Example 1a of EP-A-1 362 081. A red pigment composition is obtained with a median particle size $d_{50}$=32 nm and a $d_{95}$ value of 47 nm with a standard deviation σ of 11 nm.

Length to width ratio: 1.3:1

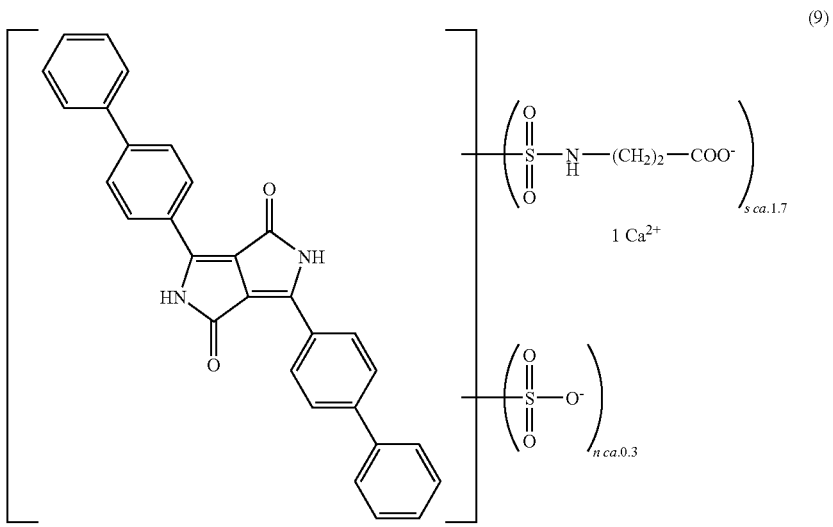

(9)

EXAMPLE 6

Example 4 is repeated using in the kneading operation 1.5 g of a synergist (10) synthesized on the lines of Example 1a of EP-A-1 362 081. A red pigment composition is obtained with a median particle size $d_{50}$=28 nm and a $d_{95}$ value of 42 nm with a standard deviation σ of 9 nm.

Length to width ratio: 1.5:1

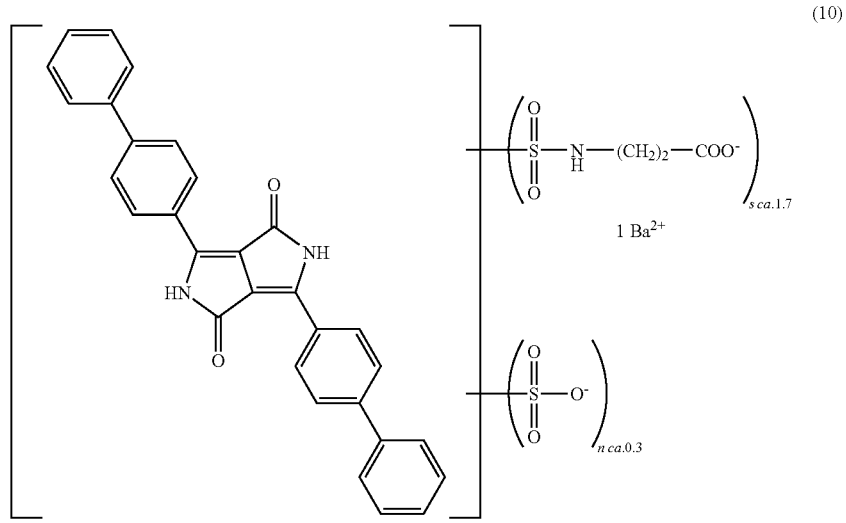

(10)

EXAMPLE 7

Example 4 is repeated using in the kneading operation 1.5 g of a synergist (11) synthesized on the lines of Example 1a of EP-A-1 362 081. A red pigment composition is obtained with a median particle size $d_{50}$=32 nm and a $d_{95}$ value of 47 nm with a standard deviation σ of 10 nm.
Length to width ratio: 1.3:1

EXAMPLE 8

Example 4 is repeated using in the kneading operation 1.5 g of a synergist (12). A red pigment composition is obtained with a median particle size $d_{50}$=27 nm and a $d_{95}$ value of 42 nm with a standard deviation σ of 8 nm.
Length to width ratio: 1.4:1

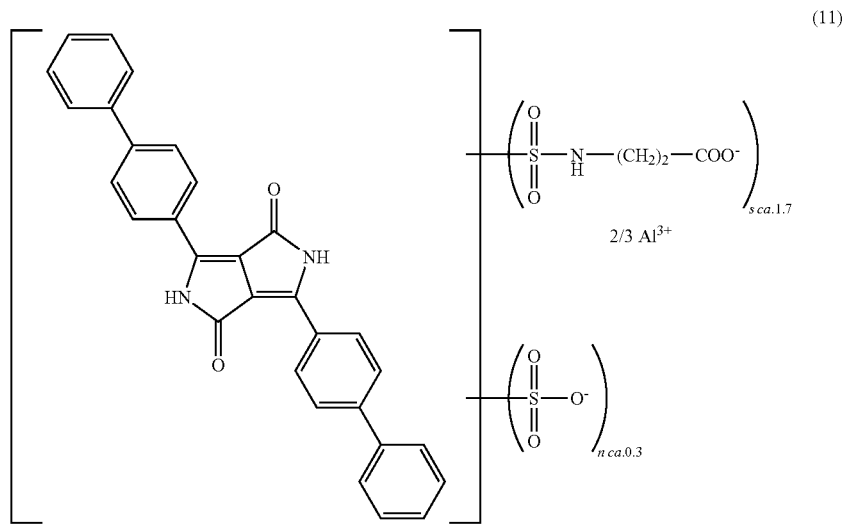

(11)

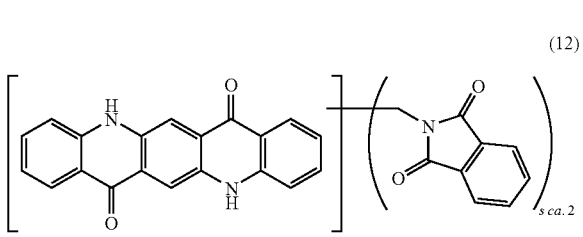

(12)

EXAMPLE 9

Example 4 is repeated using in the kneading operation 1.5 g of a synergist (13). A red pigment composition is obtained with a median particle size $d_{50}=29$ nm and a $d_{95}$ value of 41 nm with a standard deviation σ of 8 nm.

Length to width ratio: 1.3:1

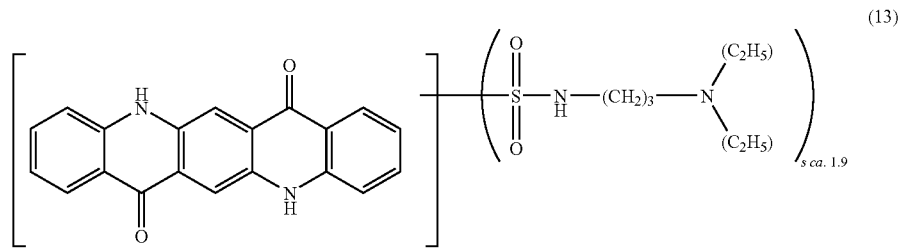

(13)

EXAMPLE 10

Example 4 is repeated using in the kneading operation 1.5 g of a synergist (14)

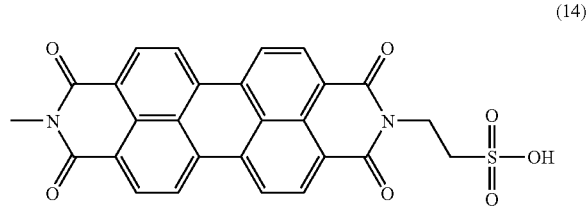

(14)

prepared on the lines of Example 3 of EP-A-0 486 531. A red pigment composition is obtained with a median particle size $d_{50}=33$ nm and a $d_{95}$ value of 50 nm with a standard deviation σ of 14 nm.

Length to width ratio: 1.5:1

TABLE 1

Particle size distribution and standard deviation

| Sample | $d_{50}$ [nm] | $d_{95}$ [nm] | Standard deviation σ [nm] |
|---|---|---|---|
| Example 1 | 28 | 41 | 7 |
| Example 2 | 30 | 45 | 8 |
| Example 3 | 28 | 42 | 8 |
| Example 4 | 29 | 45 | 10 |
| Example 5 | 32 | 47 | 11 |
| Example 6 | 28 | 42 | 9 |
| Example 7 | 32 | 47 | 10 |
| Example 8 | 27 | 42 | 8 |
| Example 9 | 29 | 41 | 8 |
| Example 10 | 33 | 50 | 14 |

TABLE 1-continued

Particle size distribution and standard deviation

| Sample | $d_{50}$ [nm] | $d_{95}$ [nm] | Standard deviation σ [nm] |
|---|---|---|---|
| Comparative Example 1 | 85 | 150 | 31 |
| Comparative Example 2 | 88 | 157 | 31 |
| Comparative Example 3 | 52 | 101 | 22 |
| Comparative Example 4 | 70 | 114 | 22 |

Use in Color Filters:

7.2 g of Joncryl® 611 styrene-acrylate resin (Johnson Polymers) are stirred in 13.4 g of PGMEA for one hour and admixed with a further 42 g of PGMEA, 7.2 g of pigment or pigment composition, 1.8 g of Solsperse® 24000 and 0.36 g of Solsperse 22000 (Avecia) with stirring. After addition of 122 g of zirconium oxide beads (0.5-0.7 mm), the mixture is dispersed in a Paint Shaker for two hours. The pigment dispersion is applied with the aid of a spin coater (POLOS Wafer Spinner) onto glass plates (SCHOTT, laser cut, 10×10 cm) and the contrast value is measured (DMS 803 goniometer, CCD-SPECT2 spectrograph).

| Sample | Contrast value |
|---|---|
| Example 1 | 1708 |
| Example 2 | 1109 |
| Example 3 | 1225 |
| Example 4 | 2210 |
| Example 5 | 2315 |
| Example 6 | 2163 |
| Example 7 | 1742 |
| Example 8 | 1750 |
| Example 9 | 2350 |
| Example 10 | 1822 |
| Comparative Example 1 | 292 |
| Comparative Example 2 | 273 |
| Comparative Example 3 | 610 |
| Comparative Example 4 | 853 |

The pigment compositions of Examples 1 to 10 have a high contrast value which makes them suitable for color filter applications.

On heating of the plates to 230° C. the pigments do not show any tendency to recrystallize, the contrast value decreasing by 10% at the most.

Coating Applications:

To determine the coloristic properties of the pigments in coating applications, the pigments obtained were fully dispersed in a transparent alkyd-melamine baking finish system.

To determine color strength, a reduction coating was prepared by mixing 6.0 g of the alkyd-melamine masstone coating with 20.0 g of a 30% white varnish. The reduction coating obtained was applied to a white piece of cardboard together with and next to the sample to be compared, air dried for 30 min and then baked at 140° C. for 30 min. Color strength and its measurement is defined in DIN EN ISO 787-26.

The color strengths, chroma (color cleanness) and transparency of the pigments prepared in the above examples are reported in the table below. The pigment of Comparative Example 4 was used as standard for the color strength (100%), the chroma ΔC (cleanness) and the hue ΔH.

|  | Color strength | Hue (ΔH) | Chroma (ΔC) |
|---|---|---|---|
| Comparative Example 4 | — | — | — |
| Example 2 | 100% | 0.64 | 0.43 |
| Example 1 | 95% | 0.01 | −0.56 |
| Example 3 | 97% | −0.03 | −0.98 |
| Comparative Example 3 | 83% | −8.54 | −13.56 |

An equimolar mixture of the two nitriles (Comparative Example 3) produces a pronounced deviation in hue compared with pure P.R. 254 (Comparative Example 4) and a pronounced decrease in chroma.

EXAMPLE A

Dispersant (VIII)

a) Diazo (mixture 1)

89.6 parts of 2-amino-4-chloro-5-methylbenzenesulfonic acid are dissolved in 400 parts of water and 41 parts of aqueous sodium hydroxide solution (w=33%). A diazotization is carried out with 162 parts of hydrochloric acid (w=31%) and 73 parts of sodium nitrite solution (w=40%) at 10° C. Then, 50 parts of sodium acetate are added to set a pH of 3-4.

b) Coupler (mixture 2)

79 parts of BONS (3-hydroxynaphthalene-2-carboxylic acid) are dissolved in 1600 parts of water and 98 parts of aqueous sodium hydroxide solution to 33%. Ice is added to cool down to 10° C.

c) Coupling

Mixture 1 is added to mixture 2 at 15° C. during 90 minutes. This is followed by stirring for one hour at 30° C. and then for one hour at 60° C. The resulting deep red suspension is filtered, washed and dried at 80° C. in a circulating air cabinet to leave 160 parts of dispersant (VIII).

EXAMPLES B TO U

Dispersants (IX) to (XXVIII) are prepared similarly to Example A.

EXAMPLE V

Preparation of base pigment (mixture of bis(4-chlorophenyl)diketo-pyrrolopyrrole (I), (4-chlorophenyl)-(X-biphenyl)diketopyrrolopyrrole (II) and bis(X-biphenyl)diketopyrrolopyrrole (III))

In a flask, 1.6 g of 4-cyanobiphenyl (4 mol %) and 29.7 g of 4-chlorobenzonitrile (96 mol %) are introduced into sodium amoxide solution in tert-amyl alcohol (prepared from 9.3 g of sodium and 177 ml of tert-amyl alcohol) and heated to 100° C.

30 g of diisopropyl succinate are added during two hours. After a further four hours at 100° C., the pigment alkali metal salt suspension is cooled down to 80° C. and poured onto hot water at 60° C. The pigment suspension is for conditioning subsequently heated to 95° C. for five hours, filtered off, washed with methanol and water and dried in a drying cabinet at 75° C. A red pigment is obtained. The red pigment obtained is subsequently subjected to a salt-kneading operation. To this end, 15 g of the dry pigment are kneaded with 90 g of sodium chloride and 22 ml of diethylene glycol at a temperature of 80° C. for 24 h. The kneaded dough is stirred into 0.9 l of 5% hydrochloric acid for two hours and the pigment is subsequently filtered off.

The filter cake is treated again for 1 h with 0.9 l of demineralized water with stirring. After filtration, the pigment is washed salt- and acid-free with water and dried under reduced pressure.

The pigment composition obtained has a median particle size $d_{50}$=28 nm and a $d_{95}$ value of 41 nm with a standard deviation σ of 7 nm.

Length to width ratio: 1.4:1

EXAMPLE A1

A pigment composition is prepared similarly to Example V using 1.6 g of 4-cyanobiphenyl (4 mol %) and 29.7 g of 4 chlorobenzonitrile (96 mol %). The red pigment is subsequently subjected to a salt-kneading operation. To this end, 14 g of the dry pigment, 1.4 g of pigment dispersant (31), prepared on the lines of Example 10a of EP-A-1 104 789, and 1.4 g of dispersant (VIII) are kneaded with 90 g of sodium chloride and 22 ml of diethylene glycol at a temperature of 80° C. for 24 h. The kneaded dough is stirred in 0.9 l of 5% hydrochloric acid for two hours and the pigment is subsequently filtered off.

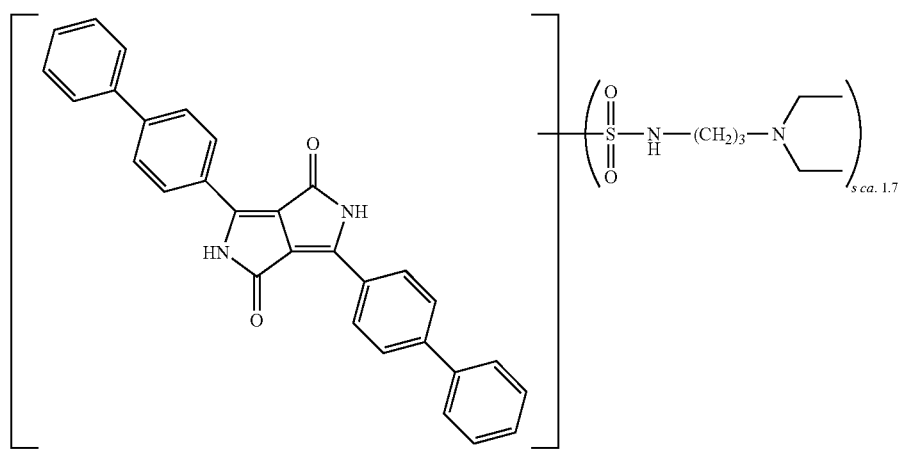

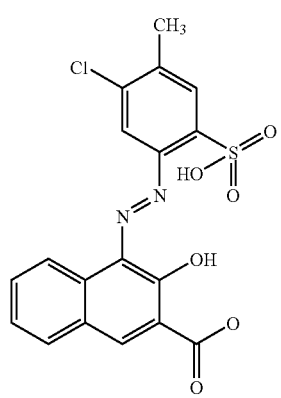

(VIII)

The filter cake is treated again for 1 h with 0.9 l of demineralized water with stirring. After filtration, the pigment is washed salt- and acid-free with water and dried under reduced pressure.

The red pigment composition obtained has a median particle size $d_{50}=29$ nm and a $d_{95}$ value of 45 nm with a standard deviation σ of 10 nm.

Length to width ratio: 1.5:1

EXAMPLE A2

Example 1A is repeated using 1.4 g of pigment dispersant (31) and 1.4 g of dispersant (IX) in the kneading to obtain a red pigment composition having a median particle size $d_{50}=31$ nm and a $d_{95}$ value of 49 nm with a standard deviation σ of 10 nm.

Length to width ratio: 1.4:1

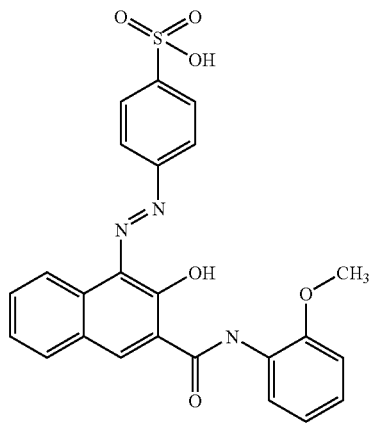

(IX)

EXAMPLE A3

Example 1A is repeated using 1.4 g of pigment dispersant (31) and 1.4 g of dispersant (XIV) in the kneading to obtain a red pigment composition having a median particle size $d_{50}=33$ nm and a $d_{95}$ value of 53 nm with a standard deviation σ of 10 nm.

Length to width ratio: 1.5:1

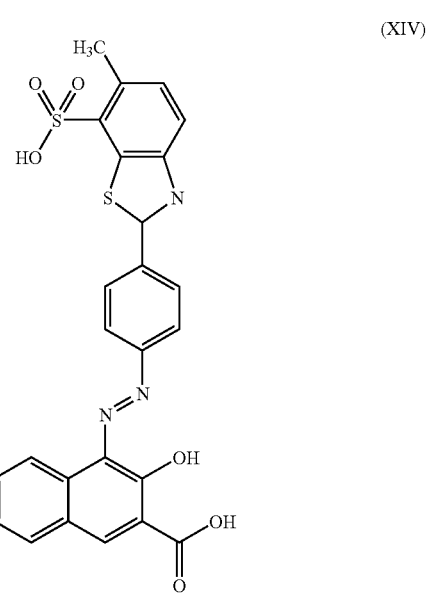

(XIV)

EXAMPLE A4

Example A1 is repeated using 1.4 g of pigment dispersant (32), prepared on the lines of Example 1 of EP-A-3 106 906, and 1.9 g of dispersant (IX) in the kneading to obtain a red pigment composition having a median particle size $d_{50}=34$ nm and a $d_{95}$ value of 50 nm with a standard deviation σ of 10 nm.

Length to width ratio: 1.4:1

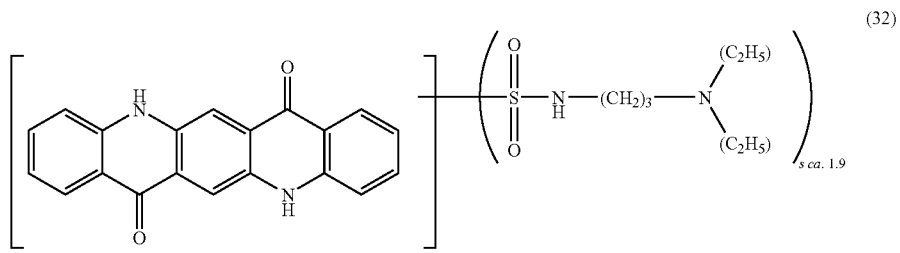
(32)

EXAMPLE A5

Example 1A is repeated using 0.7 g of pigment dispersant (32) and 0.42 g of dispersant (VIII) in the kneading to obtain a red pigment composition having a median particle size $d_{50}=27$ nm and a $d_{95}$ value of 42 nm with a standard deviation σ of 10 nm.

Length to width ratio: 1.5:1

EXAMPLE A6

Example A1 is repeated except that 1.4 g of dispersant (IX) is used as sole dispersant in the kneading to obtain a red pigment composition having a median particle size $d_{50}=35$ nm and a $d_{95}$ value of 50 nm with a standard deviation σ of 12 nm.

Length to width ratio: 1.5:1

EXAMPLE A7

Example A1 is repeated except that 1.4 g of dispersant (VIII) is used as sole dispersant in the kneading to obtain a red pigment composition having a median particle size $d_{50}=40$ nm and a $d_{95}$ value of 63 nm with a standard deviation σ of 12 nm.

Length to width ratio: 1.5:1

EXAMPLE A8

Example A1 is repeated except that 2.1 g of dispersant (IX) is used as sole dispersant in the kneading to obtain a red pigment composition having a median particle size $d_{50}=38$ nm and a $d_{95}$ value of 58 nm with a standard deviation σ of 11 nm.

Length to width ratio: 1.5:1

EXAMPLE A9

Example A1 is repeated except that 1.4 g of dispersant (XVI) is used as sole dispersant in the kneading to obtain a red pigment composition having a median particle size $d_{50}=45$ nm and a $d_{95}$ value of 63 nm with a standard deviation σ of 13 nm.

Length to width ratio: 1.5:1

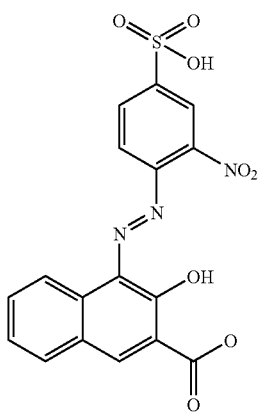
(XVI)

EXAMPLE A10

Example A1 is repeated except that 1.4 g of dispersant (XXIV) is used as sole dispersant in the kneading to obtain a red pigment composition having a median particle size $d_{50}=32$ nm and a $d_{95}$ value of 56 nm with a standard deviation σ of 10 nm.

Length to width ratio: 1.5:1

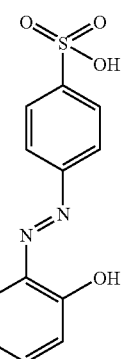
(XXIV)

EXAMPLE A11

Example A1 is repeated except that 1.4 g of dispersant (XXII) is used as sole dispersant in the kneading to obtain a red pigment composition having a median particle size $d_{50}$=36 nm and a $d_{95}$ value of 63 nm with a standard deviation σ of 10 nm.

Length to width ratio: 1.5:1

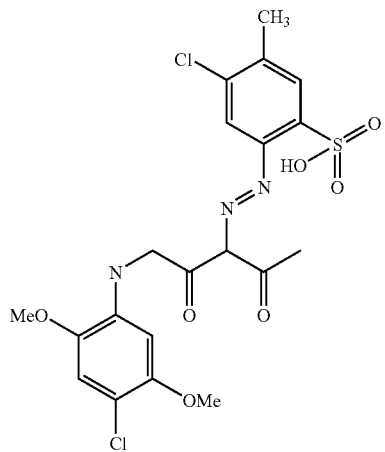

(XXII)

EXAMPLE A12

Example A1 is repeated except that 1.4 g of dispersant (XXVII) is used as sole dispersant in the kneading to obtain a red pigment composition having a median particle size $d_{50}$=31 nm and a $d_{95}$ value of 52 nm with a standard deviation σ of 13 nm.

Length to width ratio: 1.5:1

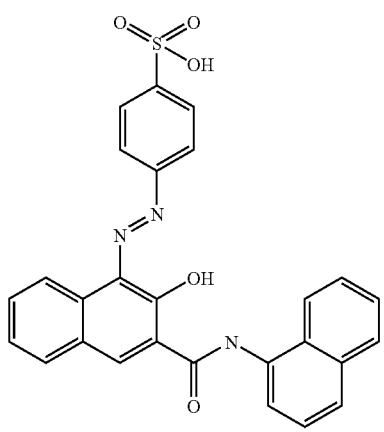

(XXVII)

EXAMPLE A13

Aftertreatment after Kneading

A red pigment is prepared as in Example V, the stirring out of the kneaded cake with 5% hydrochloric acid being followed by renewed pasting up with 0.9 l of demineralized water, and by stirring up with 1.4 g of pigment dispersant (31) and 1.4 g of dispersant (IX) in aqueous suspension at 50° C. for 1 hour. Cooling is followed by filtration and washing with about 2 l of demineralized water. Drying under reduced pressure is followed by grinding to form a powder. This gives a red pigment composition having a median particle size $d_{50}$=35 nm and a $d_{95}$ value of 53 nm with a standard deviation σ of 10 nm.

Length to width ratio: 1.4:1

Use in Color Filters:

7.6 g of pigment or pigment composition are admixed with 1.8 g of Solsperse 24000 (Avecia) and 42 g of PGMEA. Addition of 122 g of zirconium oxide beads (0.5-0.7 mm) is followed by dispersion in a paint shaker for two hours. The millbase thus obtained is measured with a Haake RS75 cone and plate viscometer at 20° C. (DIN 53019, Determination of viscosity and of thixotropy). The millbase obtained is mixed with a mixture of 7.2 g of Joncryl® 611 styrene-acrylate resin (Johnson Polymers) in 13.4 g of PGMEA and redispersed in the paint shaker for 10 minutes. The pigment dispersion is applied with the aid of a spincoater (POLOS Wafer Spinner) to glass plates (SCHOTT, laser cut, 10×10 cm) and the contrast value is measured (DMS 803 goniometer, CCD-SPECT2 spectrograph). To determine heat stability, the glass plate is subsequently heated at 250° C. for 1 hour. The contrast value is remeasured and the loss compared with the non-thermally-treated glass plate is reported in percent.

| Sample | Viscosity/ mPas | Thixotropy/ Pas | Contrast value | Loss on heating (250° C.) |
|---|---|---|---|---|
| Example V | 658 | 23600 | 1658 | −31% |
| Example A1 | 139 | 1043 | 2549 | −5% |
| Example A2 | 57 | 18 | 2499 | −3% |
| Example A3 | 165 | 1948 | 2308 | −4% |
| Example A4 | 34 | 13 | 2734 | −6% |
| Example A5 | 41 | 3 | 2457 | −8% |
| Example A6 | 82 | 80 | 2528 | −27% |
| Example A7 | 109 | 801 | 2352 | −25% |
| Example A8 | 68 | 281 | 2533 | −26% |
| Example A9 | 85 | 371 | 2431 | −26% |
| Example A10 | 67 | 57 | 2315 | −25% |
| Example A11 | 145 | 302 | 2167 | −26% |
| Example A12 | 46 | 65 | 2337 | −30% |
| Example A13 | 20 | 7 | 2653 | −9% |

The pigment compositions of Examples A1 to A13 are by virtue of their high contrast value and the low viscosity and thixotropy of the millbase very useful for color filter applications.

In addition, some of them have a very high heat stability.

What is claimed is:

1. A pigment composition of compounds of the formulae (I), (II) and (III), wherein the pigment composition has a median particle size ($d_{50}$) in the range from 10 to 60 nm, and less than 5% by volume of the particles being greater than 70 nm,

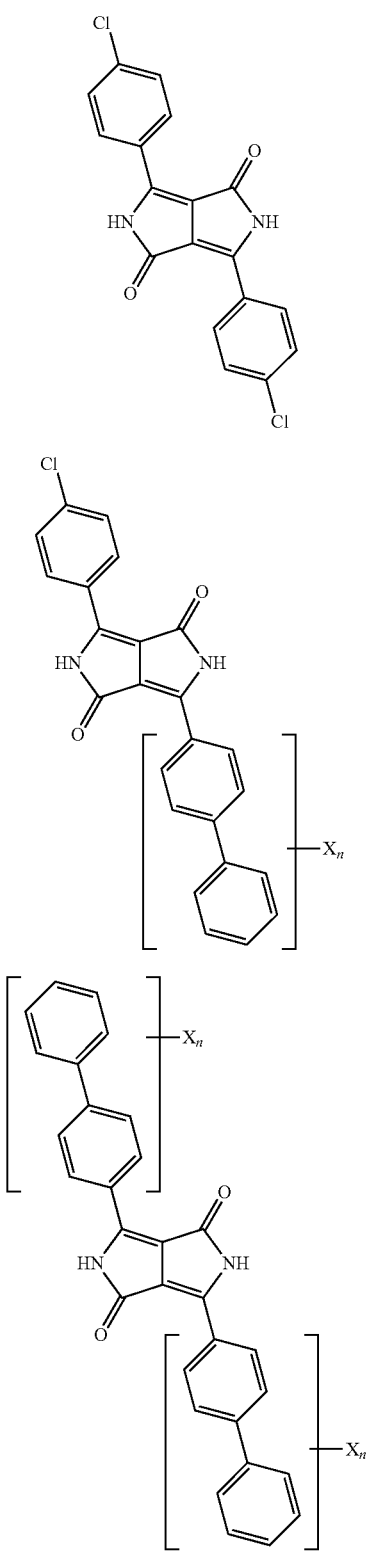

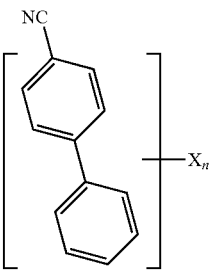

wherein n is a number from 0 to 4; and

X is OH, F, Cl, Br, CN, $CF_3$, nitro, $C_1$-$C_8$-alkyl, $C_5$-$C_7$-cycloalkyl $C_2$-$C_8$-alkenyl, $C_1$-$C_8$-alkoxy, phenyl or benzyl.

2. The pigment composition as claimed in claim 1, wherein n is zero.

3. The pigment composition as claimed in claim 1, wherein the length to width ratio of the pigment particles of the pigment composition is between 2:1 and 1:1.

4. The pigment composition as claimed in claim 1, further comprising one or more auxiliaries selected from the group consisting of surfactants, dispersants, fillers, standardizers, resins, waxes, defoamers, dustproofers, extenders, antistats, preservatives, dryness retarders, wetters, antioxidants, UV absorbers and light stabilizers.

5. The pigment composition as claimed in claim 4, wherein the dispersant is a pigment dispersant of the formula (5) or (6)

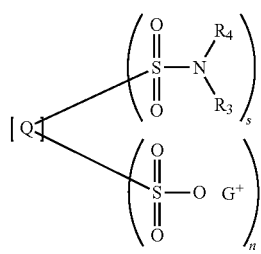

wherein

Q is a residue of an organic pigment selected from the group consisting of perinone pigments, quinacridone pigments, quinacridonequinone pigments, anthanthrone pigments, indanthrone pigments, dioxazine pigments, diketopyrrolopyrrole pigments, indigo pigments, thioindigo pigments, thiazineindigo pigments, isoindoline pigments, isoindolinone pigments, pyranthrone pigments, isoviolanthrone pigments, flavanthrone pigments and anthrapyrimidine pigments;

s is a number from 1 to 5;

n is a number from 0 to 4; the sum total of s and n being 1 to 5;

$R_3$ is a branched or unbranched, saturated or unsaturated, aliphatic hydrocarbyl radical having 1 to 20 carbon atoms, or is a $C_5$-$C_7$-cycloalkyl radical, or is an araliphatic or aromatic radical having 1, 2 or 3 aromatic rings, the rings being fused or linked by a bond, or a heterocyclic radical having 1, 2 or 3 rings containing 1, 2, 3 or 4 heteroatoms selected from the group consisting of O, N and S, or a combination thereof; where the hydrocarbyl, cycloalkyl, aromatic, araliphatic and heteroaromatic radicals are optionally substituted by 1, 2, 3 or 4 substituents selected from the group consisting of OH, CN, F, Cl, Br, $NO_2$, $CF_3$, $C_1$-$C_6$-alkoxy, obtained by reacting 1 mol of a succinic diester with 2 mol of a nitrile mixture A-CN and B-CN, the molar ratio of A-CN and B-CN in the nitrile mixture being in the range from 99.5:0.5 to 85.0:15, relative to each other, A-CN being 4-chlorobenzonitrile and B-CN being a nitrile of the formula (IV)

$NHCONH_2$, $NHC(NH)NH_2$, $NHCO$—$C_1$-$C_6$-alkyl, $C_1$-$C_6$-alkyl, $COOR_5$, $CONR_5R_6$, $NR_5R_6$, $SO_3R_5$ $SO_2$—$NR_5R_6$, $SO_3^-E^+$ and $COO^-E^+$, where $R_5$ and $R_6$ are the same or different and are each hydrogen, phenyl or $C_1$-$C_6$-alkyl;

$R_4$ is hydrogen or $R_3$;

$E^+$, $G^+$ are independently $H^+$ or the equivalent $M^{p+}/m$ of a metal cation $M^{p+}$ from the 1st to 5th main group or from the 1st or 2nd or 4th to 8th transition group of the periodic table of elements, where m is one of the numbers 1, 2 or 3 and p is 1, 2 or 3;

or a substituted or unsubstituted ammonium ion;

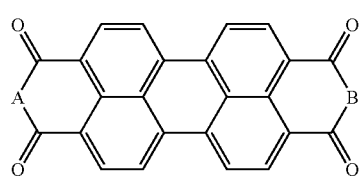

(6)

wherein

A is a bivalent radical —O—, —$NR_3$— or —$NR_{16}$—$SO_3^-$ $G^+$,

B is a bivalent radical —$NR_{16}$—$SO_3^-G^+$, wherein $R_{16}$ is a straight-chain or branched $C_1$-$C_6$-alkylene chain and $R_3$ and $G^+$ are each as defined above.

6. The pigment composition as claimed in claim 5, wherein the dioxazine pigments is triphendioxazines.

7. The pigment composition as claimed in claim 1, further comprising a basic pigment dispersant of the formula (29)

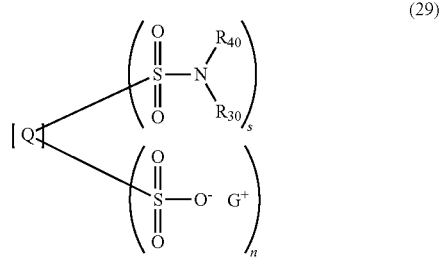

(29)

where

Q is a residue of an organic pigment selected from the group consisting of perinone pigments, quinacridone pigments, quinacridonequinone pigments, anthanthrone pigments, indanthrone pigments, dioxazine pigments, diketopyrrolopyrrole pigments, indigo pigments, thioindigo pigments, thiazineindigo pigments, isoindoline pigments, isoindolinone pigments, pyranthrone pigments, isoviolanthrone pigments, flavanthrone pigments and anthrapyrimidine pigments;

s is a number from 1 to 5;

n is a number from 0 to 4; the sum of s and n being 1 to 5 and s being greater than n;

$R_{30}$ is a branched or unbranched, saturated or unsaturated, aliphatic hydrocarbyl radical having 1 to 20 carbon atoms, or is a $C_5$-$C_7$-cycloalkyl radical, or is an araliphatic or aromatic radical having 1, 2 or 3 aromatic rings, the rings being fused or linked by a bond, or is a heterocyclic radical having 1, 2 or 3 rings containing 1, 2, 3 or 4 heteroatoms selected from the group consisting of O, N and S, or a combination thereof; where the hydrocarbyl, cycloalkyl, aromatic, araliphatic and heteroaromatic radicals are optionally substituted by 1, 2, 3 or 4 substituents selected from the group consisting of OH, CN, F, Cl, Br, $NO_2$, $CF_3$, $C_1$-$C_6$-alkoxy, S—$C_1$-$C_6$-alkyl, $NHCONH_2$, $NHC(NH)NH_2$, $NHCO$—$C_1$-$C_6$-alkyl, $C_1$-$C_6$-alkyl, $CONR_5R_6$ and $NR_5R_6$, where $R_5$ and $R_6$ are the same or different and are each hydrogen, phenyl or $C_1$-$C_6$-alkyl;

$R_{40}$ is hydrogen or $R_{30}$;

$G^+$ is $H^+$, an alkali metal or a substituted or unsubstituted ammonium ion.

8. The pigment composition as claimed in claim 7, wherein

Q is a residue of an organic pigment selected from the group consisting of diketopyrrolopyrrole pigments, and quinacridone pigments;

$R_{30}$ is $C_1$-$C_6$-alkyl substituted by $NR_5R_6$, where $R_5$ and $R_6$ are the same or different and are each hydrogen or $C_1$-$C_6$-alkyl;

$R_{40}$ is hydrogen, $G^+$ is hydrogen, Li, Na, K or an ammonium ion.

9. The pigment composition as claimed in claim 8, wherein the diketopyrrolopyrrole pigments are C.I. Pigment Red 255 or 264.

10. The pigment composition as claimed in claim 8, wherein the quinacridone pigments are C.I. Pigment Violet 19 or Pigment Red 122.

11. The pigment composition as claimed in claim 7, containing 1% to 25% by weight of the unlaked sulfo-containing monoazo dye, and 1% to 25% by weight of the pigment dispersant of the formula (29), based on the mixture used of the pigments of the formulae (I) to (III).

12. The pigment composition as claimed in claim 7, containing 5% to 15% by weight of the unlaked sulfo-containing monoazo dye, and 5% to 15% by weight of the pigment dispersant of the formula (29), based on the mixture used of the pigments of the formulae (I) to (III).

13. A pigmented article pigmented by a pigment composition as claimed in claim 1, wherein the article is in the form of plastics, resins, coatings, paints, electrophotographic toners, electrophotographic developers, color filters liquid inks, inkjet inks, or printing inks.

14. A pigment composition of pigments of the formulae (I), (II) and (III), wherein the pigment composition has a median particle size ($d_{50}$) in the range from 10 to 60 nm, and less than 5% by volume of the particles being greater than 70 nm

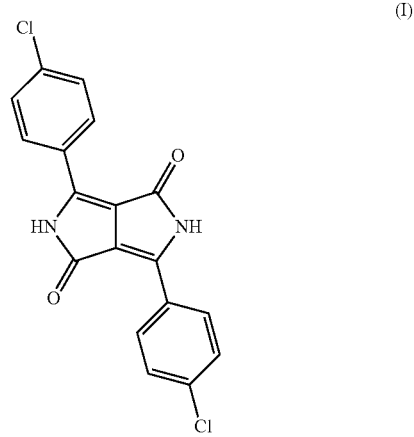

(I)

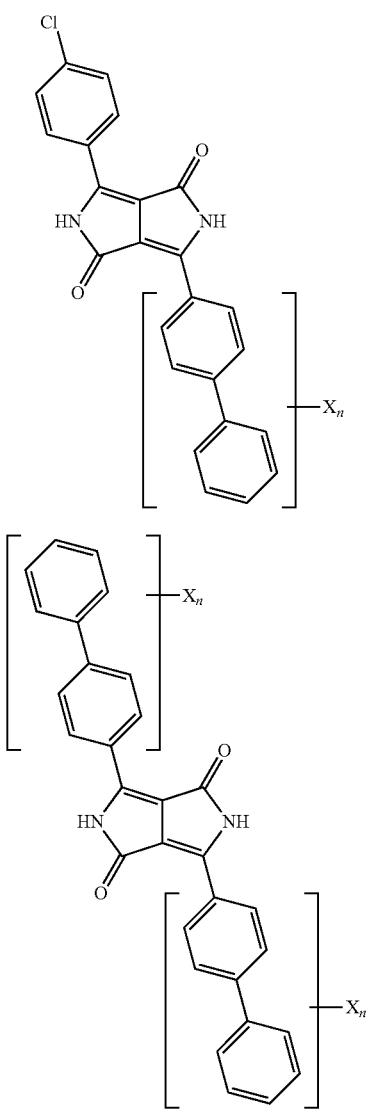

(II)

(III)

where n is a number from 0 to 4; and

X is OH, F, Cl, Br, CN, $CF_3$, nitro, $C_1$-$C_8$-alkyl, $C_5$-$C_7$-cycloalkyl, $C_2$-$C_8$-alkenyl, $C_1$-$C_8$-alkoxy, phenyl, benzyl;

and containing at least one dispersant, wherein the at least one dispersant is an unlaked sulfo-containing monoazo dye.

15. The pigment composition as claimed in claim 14, wherein the unlaked sulfo-containing monoazo dye is a compound of the formulae (IV), (V), (VI) or (VII)

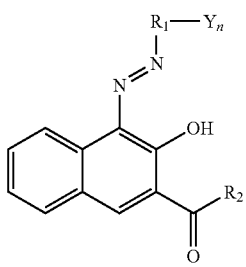

(IV)

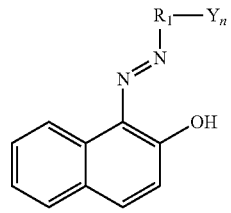

(V)

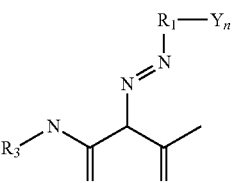

(VI)

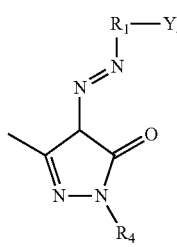

(VII)

wherein $R_1$ is an aromatic radical having 1, 2 or 3 aromatic rings, the rings being fused or linked by a bond, or a heterocyclic radical having 1, 2 or 3 rings containing 1, 2, 3 or 4 heteroatoms selected from the group consisting of O, N and S; or a combination thereof;

where the aromatic and heteroaromatic radicals are optionally substituted by 1, 2, 3 or 4 substituents selected from the group consisting of OH, CN, F, Cl, Br, $NO_2$, $CF_3$, $C_1$-$C_6$-alkoxy, S—$C_1$-$C_6$-alkyl, $NHCONH_2$, $NHC(NH)NH_2$, NHCO—$C_1$-$C_6$-alkyl, $C_1$-$C_6$-alkyl, $COOR_5$, $CONR_5R_6$, $NR_5R_6$, $SO_3R_5$, $SO_2$—$NR_5R_6$— and $COO^-E^+$, where $R_5$ and $R_6$ are the same or different and are each hydrogen, phenyl or $C_1$-$C_6$-alkyl and $E^+$ is hydrogen, lithium, sodium, potassium, rubidium cesium or an unsubstituted ammonium ion;

Y is $SO_3^-E^+$ or $Z$–$SO_3^-E^+$, where Z is $C_1$-$C_{10}$-alkylene or phenylene;

n is 1, 2 or 3;

$R_2$ is —$OR_8$ or —$NHR_8$, where $R_8$ is H, $C_1$-$C_6$-alkyl, benzyl, an aromatic radical having 1, 2 or 3 aromatic rings, the rings being fused or linked by a bond, or a heterocyclic radical having 1, 2 or 3 rings containing 1, 2, 3 or 4 heteroatoms selected from the group consisting of O, N and S; or a combination thereof;

where the aromatic and heteroaromatic radicals are optionally substituted by 1, 2, 3 or 4 substituents selected from the group consisting of OH, $C_1$-$C_6$-alkoxy, S—$C_1$-$C_6$-alkyl, halogen, $NHCONH_2$, NHC(NH)$NH_2$, NHCO—$C_1$-$C_6$-alkyl, $C_1$-$C_6$-alkyl, nitro, $COOR_5$, $CONR_5R_6$, $SO_3R^5$, $SO_2$—$NR_5R_6$, $NR_9R_{10}$, $SO_3^-E^+$ and $COO^-E^+$, where $R_5$ and $R_6$ are the same or different and are each hydrogen, phenyl or $C_1$-$C_6$-alkyl; $R_9$ and $R_{10}$ are the same or different and are each hydrogen, phenyl or $C_1$-$C_6$-alkyl;

$R_3$ and $R_4$ are each an aromatic radical having 1, 2 or 3 aromatic rings the rings being fused or linked by a bond, or a heterocyclic radical having 1, 2 or 3 rings containing 1, 2, 3 or 4 heteroatoms selected from the group consisting of O, N and S; or a combination thereof;

where the aromatic and heteroaromatic radicals are each optionally substituted by 1, 2, 3 or 4 substituents selected from the group consisting of OH, $C_1$-$C_6$-alkoxy, S—$C_1$-$C_6$-alkyl, halogen, $NHCONH_2$, NHC($NH$)$NH_2$, NHCO—$C_1$-$C_6$-alkyl, $C_1$-$C_6$-alkyl, nitro, $COOR_5$, $CONR_5R_6$, $SO_3R_5$, $SO_2$—$NR_5R_6$, $NR_9R_{10}$, $SO_3^-E^+$ and $COO^-E^+$, where $R_5$ and $R_6$ are the same or different and are each hydrogen, phenyl or $C_1$-$C_6$-alkyl; $R_9$ and $R_{10}$ are the same or different and are each hydrogen, phenyl or $C_1$-$C_6$-alkyl.

16. The pigment composition as claimed in claim 15, wherein the $R_2$ radical is OH or O—$C_1$-$C_6$-alkyl.

17. The pigment composition as claimed in claim 15, wherein the CO—$R_2$ radical is an amide group where $R_2$ is $NH_2$,

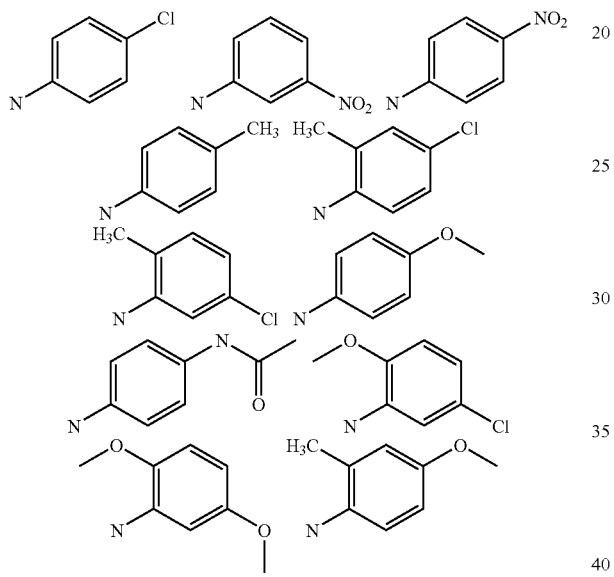

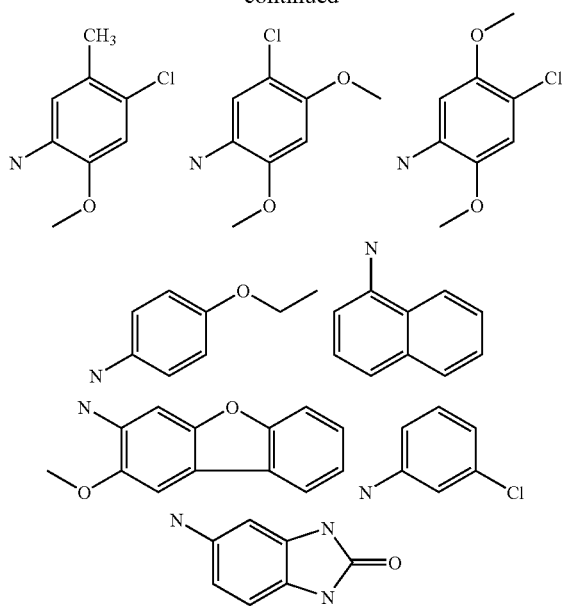

wherein the bond to the carbonyl group in the above formulae are via the free amino group N— of the aromatic ring.

18. The pigment composition as claimed in claim 15, wherein the halogen is F, Cl, or Br.

19. A process for producing the pigment composition as claimed in claim 14, comprising the step of admixing the mixture of the compounds of the formulae (I), (II) and (III) with the unlaked sulfo-containing monoazo dye and optionally the pigment dispersant before, during and/or after a conversion into a fine state of subdivision, or during and/or after a finishing treatment.

\* \* \* \* \*